US012710261B2

(12) United States Patent
Zhu et al.

(10) Patent No.: US 12,710,261 B2
(45) Date of Patent: Aug. 18, 2026

(54) HIGHLY SENSITIVE, STRETCHABLE, AND ROBUST STRAIN SENSORS AND RELATED METHODS

(71) Applicant: North Carolina State University, Raleigh, NC (US)

(72) Inventors: Yong Zhu, Apex, NC (US); Shuang Wu, Raleigh, NC (US)

(73) Assignee: NORTH CAROLINA STATE UNIVERSITY, Raleigh, NC (US)

( * ) Notice: Subject to any disclaimer, the term of this patent is extended or adjusted under 35 U.S.C. 154(b) by 294 days.

(21) Appl. No.: 18/640,503

(22) Filed: Apr. 19, 2024

(65) Prior Publication Data

US 2024/0353218 A1 Oct. 24, 2024

Related U.S. Application Data

(60) Provisional application No. 63/460,865, filed on Apr. 20, 2023.

(51) Int. Cl.
*G01B 7/16* (2006.01)

(52) U.S. Cl.
CPC .................................... *G01B 7/18* (2013.01)

(58) Field of Classification Search
CPC .................................. G01B 7/18; G01B 7/20
See application file for complete search history.

(56) References Cited

U.S. PATENT DOCUMENTS

| | | | | |
|---|---|---|---|---|
| 5,633,466 A * | 5/1997 | Yanagida | G01B 7/16 73/770 |
| 8,445,889 B2 * | 5/2013 | Bhupendra | G03F 7/0002 438/758 |
| 9,347,141 B2 * | 5/2016 | Yang | H10F 71/00 |
| 9,478,835 B2 * | 10/2016 | Mak | B82Y 10/00 |
| 2011/0231125 A1 * | 9/2011 | Rolet | G01B 7/18 702/64 |
| 2016/0192501 A1 * | 6/2016 | Yan | H05K 3/207 29/846 |
| 2016/0290780 A1 * | 10/2016 | Lee | G01L 1/22 |
| 2018/0149531 A1 * | 5/2018 | Atashbar | G01L 1/2287 |

(Continued)

OTHER PUBLICATIONS

Yao, S.; Cul, J.; Cui, Z.; Zhu, Y. Soft Electrothermal Actuators Using Silver Nanowire Heaters. Nanoscale 2017, 9, 3797-3805.

(Continued)

*Primary Examiner* — David J Bolduc
(74) *Attorney, Agent, or Firm* — Jenkins, Taylor & Hunt, P.A.

(57) ABSTRACT

An exemplary method for producing a strain sensor using crack propagation includes opening and blunting includes applying conductive nanowires to a substrate to form a conductive nanowire network on the substrate. The method also includes applying an elastomer to the nanowire network to form a composite layer on top of the conductive nanowire network. The method also includes removing the substrate from the conductive nanowire network, wherein removing the substrate at least partially exposes a surface of the conductive nanowire network. The method further includes cutting intervallic incisions in the surface of the conductive nanowire network, wherein the intervallic incisions extend alternatingly and inwardly from one of two opposing edges of the conductive nanowire network.

20 Claims, 22 Drawing Sheets

(56) References Cited

U.S. PATENT DOCUMENTS

| | | | | |
|---|---|---|---|---|
| 2022/0009764 A1* | 1/2022 | Zhou | ..................... | B81B 3/0027 |
| 2022/0056295 A1* | 2/2022 | Araki | ........................ | G01B 7/20 |
| 2024/0230432 A1* | 7/2024 | Kim | .......................... | G01L 5/10 |

OTHER PUBLICATIONS

Xia, Y.; Yang, P.; Sun, Y.; Wu, Y.; Mayers, B.; Gates, B. et al., One-Dimensional Nanostructures: Synthesis, Characterization, and Applications. Adv. Mater. 2003, 15, 353-389.
Dankaerts, W.; O'Sullivan, P.; Burnett, A.; Straker, L. Differences in Sitting Postures Are Associated with Nonspecific Chronic Low Back Pain Disorders When Patients Are Subclassified. Spine 2006, 31, 698-704.
Roy, S. H.; De Luca, C. J.; Casavant, D. A. Lumbar Muscle Fatigue and Chronic Lower Back Pain. Spine 1989, 14, 992-1001.
Ma, Y.; Choi, J.; Hourlier-Fargette, A.; Xue, Y.; Chung, H. U. et al., Relation between Blood Pressure and Pulse Wave Velocity for Human Arteries, Proc. Natl. Acad. Sci. U.S.A. 2018, 115, 11144-11149.
Liao, Q.; Mohr, M.; Zhang, X.; Zhang, Z.; Zhang, Y.; Fecht, H.-J. Carbon Fiber-Zno Nanowire Hybrid Structures for Flexible and Adaptable Strain Sensors. Nanoscale 2013, 5, 12350-12355.
Xu, F.; Zhu, Y. Highly Conductive and Stretchable Silver Nanowire Conductors. Adv. Mater. 2012, 24, 5117-5122.
Deuschl, G.; Krack, P.; Lauk, M.; Timmer, J. Clinical Neurophysiology of Tremor. J. Clin. Neurophysiol. 1996, 13, 110-121.
Monje, M. H.; Foffani, G.; Obeso, J.; Sánchez-Ferro, A. New Sensor and Wearable Technologies to Aid in the Diagnosis and Treatment Monitoring of Parkinson's Disease. Ann. Rev. Biomed. Eng. 2019, 21, 111-143.
Dorsey, E. R.; Bloem, B. R. The Parkinson Pandemica Call to Action. JAMA Neurol. 2018, 75, 9-10.
Shi, C.; Zou, Z.; Lei, Z.; Zhu, P.; Nie, G.; Zhang, W.; Xiao, J. Stretchable, Rehealable, Recyclable, and Reconfigurable Integrated Strain Sensor for Joint Motion and Respiration Monitoring Research 2021, 2021, No. 9846036.
Jeong, Y. R.; Park, H.; Jin, S. W.; Hong, S. Y.; Lee, S. S.; Ha, J. S. Highly Stretchable and Sensitive Strain Sensors Using Fragmentized Graphene Foam. Adv. Funct. Mater. 2015, 25, 4228-4236.
Lee, J.; Shin, S.; Lee, S.; Song, J.; Kang, S.; Han, H.; Kim, S. et al., Highly Sensitive Multifilament Fiber Strain Sensors with Ultrabroad Sensing Range for Textile Electronics. ACS Nano 2018, 12, 4259-4268.
Atalay. O.; Atalay, A.; Gafford, J.; Wang, H.; Wood, R.; Walsh, C. A Highly Stretchable Capacitive-Based Strain Sensor Based on Metal Deposition and Laser Rastering. Adv. Mater. Technol. 2017, 2, No. 1700081.
Kang, D.; Pikhitsa, P. V.; Choi, Y. W.; Lee, C.; Shin, S. S. et al., Ultrasensitive Mechanical Crack-Based Sensor Inspired by the Spider Sensory System. Nature 2014, 516, 222-226.
Jiang, Y.; Liu, Z.; Matsuhisa, N.; Qi, D.; Leow, W. R.; Yang, H. et al., Auxetic Mechanical Metamaterials to Enhance Sensitivity of Stretchable Strain Sensors. Adv. Mater. 2018, 30, No. 1706589.
Wu, C.; Wang, X.; Lin, L.; Guo, H.; Wang, Z. L. Based Triboelectric Nanogenerators Made of Stretchable Interlocking Kirigami Patterns. ACS Nano 2016, 10, 4652-4659.
Sun, R.; Zhang, B.; Yang, L.; Zhang, W.; Farrow, I.; Scarpa, F.; Rossiter, J. Kirigami Stretchable Strain Sensors with Enhanced Piezoelectricity Induced by Topological Electrodes. Appl. Phys. Lett. 2018, 112, No. 251904.
Li, C.; Cui, Y.-L.; Tian, G.-L.; Shu, Y.; Wang, X.-F.; Tian, H. et al., Flexible Cnt-Array Double Helices Strain Sensor with High Stretchability for Motion Capture. Sci. Rep. 2015, 5, No. 15554.
Gao, Y.; Guo, F.; Cao, P.; Liu, J.; Li, D.; Wu, J.; Wang, N. et al., Winding-Locked Carbon Nanotubes/Polymer Nanofibers Helical Yarn for Ultrastretchable Conductor and Strain Sensor. ACS Nano 2020, 14, 3442-3450.
Yan, Z.; Pan, T.; Wang, D.; Li, J.; Jin, L.; Huang, L.; Jiang, J. et al., Stretchable Micromotion Sensor with Enhanced Sensitivity Using Serpentine Layout. ACS Appl. Mater. Interfaces 2019, 11, 12261-12271.
Sun, H.; Dai, K.; Zhai, W.; Zhou, Y.; Li, J.; Zheng, G. et al., A Highly Sensitive and Stretchable Yarn Strain Sensor for Human Motion Tracking Utilizing a Wrinkle-Assisted Crack Structure. ACS Appl. Mater. Interfaces 2019, 11, 36052-36062.
Huang, J.; Zhou, J.; Luo, Y.; Yan, G.; Liu, Y. et al., Wrinkle-Enabled Highly Stretchable Strain Sensors for Wide-Range Health Monitoring with a Big Data Cloud Platform. ACS Appl. Mater. Interfaces 2020, 12, 43009-43017.
Kim, K. K.; Hong, S.; Cho, H. M.; Lee, J. et al., Highly Sensitive and Stretchable Multidimensional Strain Sensor with Prestrained Anisotropic Metal Nanowire Percolation Networks. Nano Lett. 2015, 15, 5240-5247.
Yao, S.; Yang, J.; Poblete, F. R.; Hu, X.; Zhu, Y. Multifunctional Electronic Textiles Using Silver Nanowire Composites. ACS Appl. Mater. Interfaces 2019, 11, 31028-31037.
Ho, M. D.; Ling. Y.; Yap, L. W.; Wang, Y.; Dong, D. ; Zhao, Y.; Cheng, W. Percolating Network of Ultrathin Gold Nanowires and Silver Nanowires toward "Invisible" Wearable Sensors for Detecting Emotional Expression and Apexcardiogram. Adv. Funct. Mater. 2017. 27. No. 1700845.
Yao, S.; Zhu, Y. Nanomaterial-Enabled Stretchable Conductors: Strategies, Materials and Devices. Adv. Mater. 2015, 27, 1480-1511.
Xu, J.; Tat, T.; Zhao, X.; Zhou, Y.; Ngo, D.; Xiao, X.; Chen, J. A Programmable Magnetoelastic Sensor Array for Self-Powered Human-Machine Interface. Appl. Phys. Rev. 2022, 9, No. 031404.
Zhao, X.; Chen, G.; Zhou, Y.; Nashallan, A.; Xu, J.; Tat, T et al., Giant Magnetoelastic Effect Enabled Stretchable Sensor for Self-Powered Biomonitoring. ACS Nano 2022, 16, 6013-6022.
Chen, G.; Zhao, X.; Andalib, S.; Xu, J.; Zhou, Y.; Tat, T.; Lin, K.; Chen, J. Discovering Giant Magnetoelasticity in Soft Matter for Electronic Textiles. Matter 2021, 4, 3725-3740.
Zhao, X.; Zhou, Y.; Xu, J.; Chen, G.; Fang, Y.; Tat, T.; Xiao, X. et al., Soft Fibers with Magnetoelasticity for Wearable Electronics. Nat. Commun. 2021, 12, No. 6755.
Zhou, Y.; Zhao, X.; Xu, J.; Fang, Y.; Chen, G.; Song, Y.; Li, S.; Chen, J. Giant Magnetoelastic Effect in Soft Systems for Bioelectronics. Nat. Mater. 2021, 20, 1670-1676.
Zheng, M.; Li, W.; Xu, M.; Xu, N.; Chen, P.; Han, M.; Xie, B. Strain Sensors Based on Chromium Nanoparticle Arrays Nanoscale 2014, 6, 3930-3933.
Iqra, M.; Anwar, F.; Jan, R.; Mohammad, M. A. A. Flexible Piezoresistive Strain Sensor Based on Laser Scribed Graphene Oxide on Polydimethylsiloxane. Sci. Rep. 2022, 12, No. 4882.
Bae, S.-H.; Lee, Y.; Sharma, B. K.; Lee, H.-J.; Kim, J.-H.; Ahn, J.-H. Graphene-Based Transparent Strain Sensor. Carbon 2013, 51, 236-242.
Yu, X.; Cheng, H.; Zhang, M.; Zhao, Y.; Qu, L.; Shi, G. Graphene-Based Smart Materials. Nat. Rev. Mater. 2017, 2, No. 17046.
Zhu, S.; Sun, H.; Lu, Y.; Wang, S. et al., Inherently Conductive Poly (Dimethylsiloxane) Elastomers Synergistically Mediated by Nanocellulose/Carbon Nanotube Nanohybrids toward Highly Sensitive, Stretchable, and Durable Strain Sensors, ACS Appl. Mater. Interfaces 2021. 13. 59142-59153.
Ryu, S.; Lee, P.; Chou, J. B.; Xu, R.; Zhao, R. et al., Extremely Elastic Wearable Carbon Nanotube Fiber Strain Sensor for Monitoring of Human Motion. ACS Nano 2015, 9, 5929-5936.
Yamada, T., Hayamizu, Y.; Yamamoto, Y.; et al., Stretchable Carbon Nanotube Strain Sensor for Human-Motion Detection. Nat. Nanotechnol. 2011, 6, 296-301.
Wu, S.; Baker, G. L.; Yin, J.; Zhu, Y. Fast Thermal Actuators for Soft Robotics. Soft Rob. 2021, 1031-1039.
Araromi, O. A.; Graule, M. A.; Dorsey, K. L.; Castellanos, S. et al., Ultra-Sensitive and Resilient Compliant Strain Gauges for Soft Machines. Nature 2020, 587. 219-224.
Thuruthel, T. G.; Shih, B.; Laschi, C.; Tolley, M. T. Soft Robot Perception Using Embedded Soft Sensors and Recurrent Neural Networks. Sci. Rob. 2019, 4, No. eaav1488.
Rich, S. I.; Wood, R. J.; Majidi, C. Untethered Soft Robotics. Nat. Electron 2018, 1, 102-112.

(56) References Cited

OTHER PUBLICATIONS

Lu, N.; Kim, D.-H. Flexible and Stretchable Electronics Paving the Way for Soft Robotics. Soft Rob. 2014, 1, 53-62.
Zhou, W.; Yao, S.; Wang, H.; Du, Q.; Ma, Y.; Zhu, Y. Gas-Permeable, Ultrathin, Stretchable Epidermal Electronics with Porous Electrodes. ACS Nano 2020, 14, 5798-5805.
Jeong, J.-W.; Yeo, W.-H.; Akhtar, A.; Norton, J. J. S.; et al., Materials and Optimized Designs for Human-Machine Interfaces Via Epidermal Electronics. Adv. Mater. 2013, 25, 6839-6846.
Wang, K.; Yap, L. W.; Gong, S.; Wang, R.; Wang, S. J.; Cheng, W. Nanowire-Based Soft Wearable Human-Machine Interfaces for Future Virtual and Augmented Reality Applications. Adv. Funct. Mater. 2021, No. 2008347.
Yu, Y.; Nassar, J.; Xu, C.; Min, J.; Yang, Y. et al., Biofuel-Powered Soft Electronic Skin with Multiplexed and Wireless Sensing for Human-Machine Interfaces. Sci. Rob. 2020, 5, No. eaaz7946.
Yao, S.; Ren, P.; Song, R.; Liu, Y. et al., Nanomaterial-Enabled Flexible and Stretchable Sensing Systems: Processing, Integration, and Applications. Adv. Mater. 2020, 32, No. 1902343.
Yao, S.; Vargas, L.; Hu, X.; Zhu, Y. A Novel Finger Kinematic Tracking Method Based on Skin-Like Wearable Strain Sensors. IEEE Sens. J. 2018, 18, 3010-3015.
Yao, S.; Zhu, Y. Wearable Multifunctional Sensors Using Printed Stretchable Conductors Made of Silver Nanowires. Nanoscale 2014, 6, 2345-2352.
Cai, G.; Wang, J.; Qian, K.; Chen, J.; Li, S.; Lee, P. S. Extremely Stretchable Strain Sensors Based on Conductive Self-Healing Dynamic Cross-Links Hydrogels for Human-Motion Detection. Adv. Sci. 2017, 4, No. 1600190.
Amjadi, M.; Pichitpajongkit, A.; Lee, S.; Ryu, S.; Park, I. Highly Stretchable and Sensitive Strain Sensor Based on Silver Nanowire-Elastomer Nanocomposite. ACS Nano 2014, 8, 5154-5163.
Zhou, Z.; Chen, K.; Li, X.; Zhang, S. et al., Sign-to-Speech Translation Using Machine-Learning-Assisted Stretchable Sensor Arrays. Nat. Electron. 2020, 3, 571-578.
Libanori, A.; Chen, G.; Zhao, X.; Zhou, Y.; Chen, J. Smart Textiles for Personalized Healthcare. Nat. Electron. 2022, 5, 142-156.
Boutry, C. M.; Kaizawa, Y.; Schroeder, B. C.; Chortos, A. et al., A Stretchable and Biodegradable Strain and Pressure Sensor for Orthopaedic Application. Nat. Electron. 2018, 1, 314-321.
Kim, D.-H.; Lu, N., Ma, R.; Kim, Y.-S. et al., Epidermal Electronics. Science 2011, 333, 838-843.
Amjadi, M.; Kyung, K. U.; Park, I.; Sitti, M. Stretchable, Skin-Mountable, and Wearable Strain Sensors and Their Potential Applications: A Review. Adv. Funct. Mater. 2016, 26, 1678-1698.
Chung, H. U.; Rwei, A. Y.; Hourlier-Fargette, A. et al., Skin-Interfaced Biosensors for Advanced Wireless Physiological Monitoring in Neonatal and Pediatric Intensive-Care Units. Nat. Med. 2020, 26, 418-429.
Lipomi, D. J.; Vosgueritchian, M.; Tee, B. C. et al., Skin-Like Pressure and Strain Sensors Based on Transparent Elastic Films of Carbon Nanotubes. Nat. Nanotechnol. 2011, 6, 788-792.

* cited by examiner

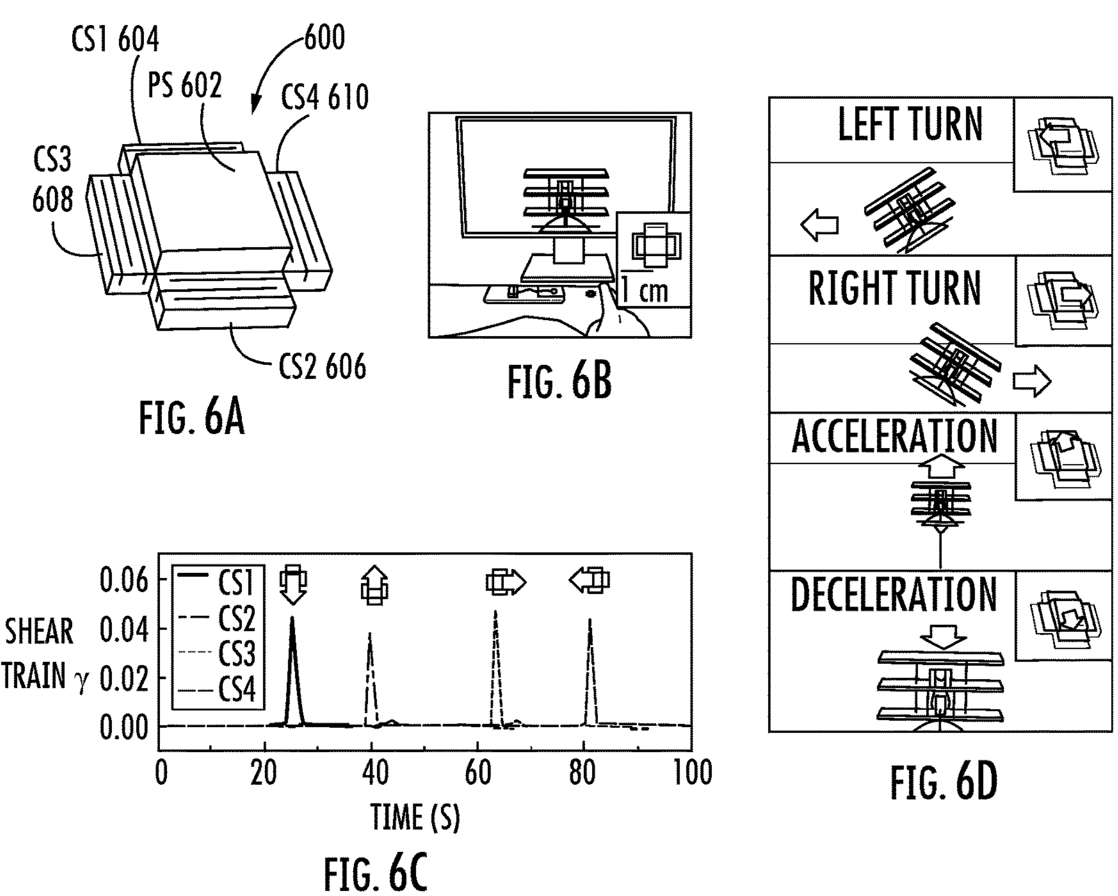
FIG. 6A
FIG. 6B
FIG. 6C
FIG. 6D
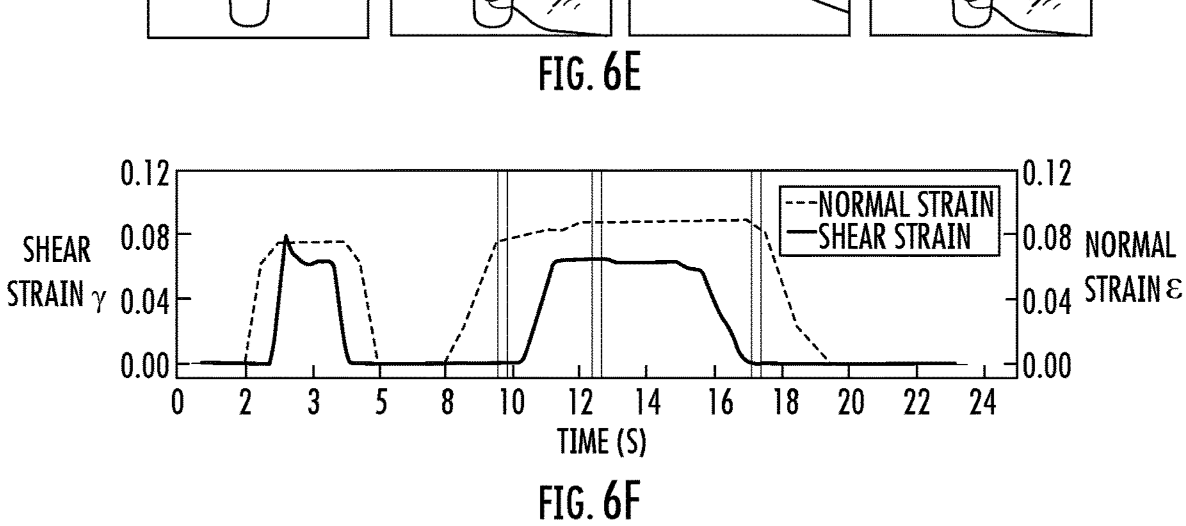
FIG. 6E
FIG. 6F

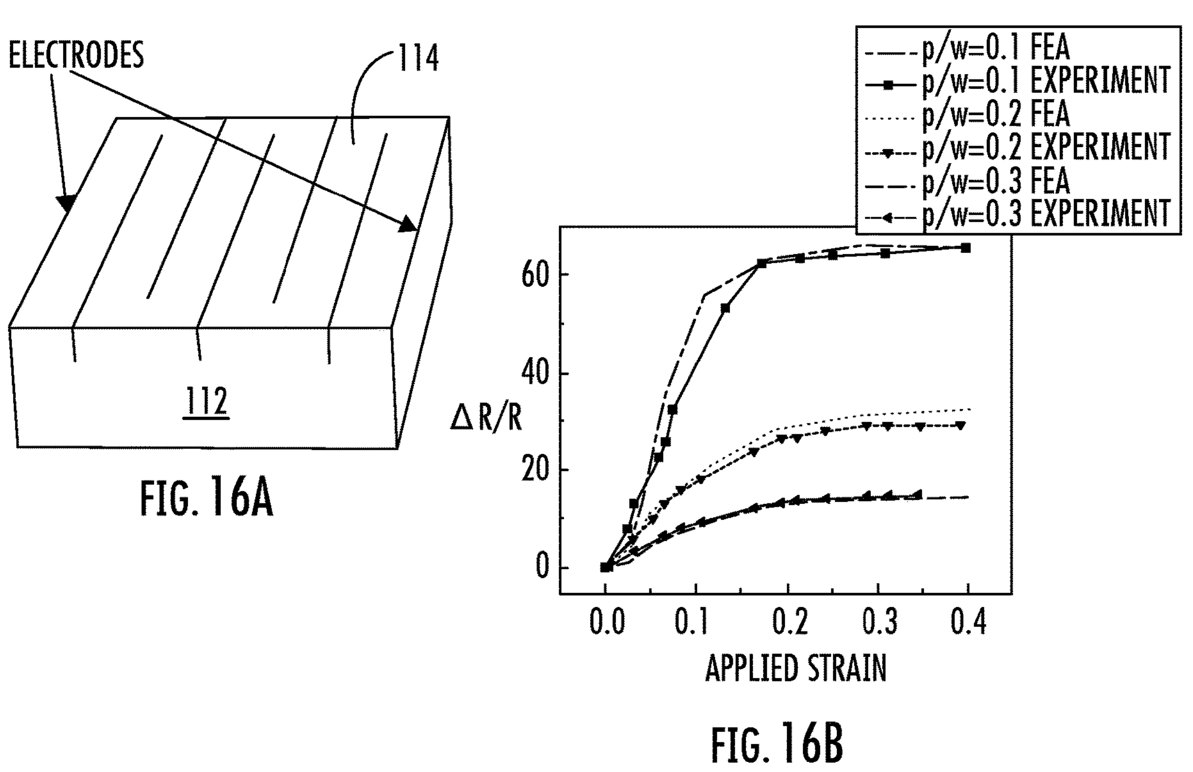
FIG. 16A
FIG. 16B
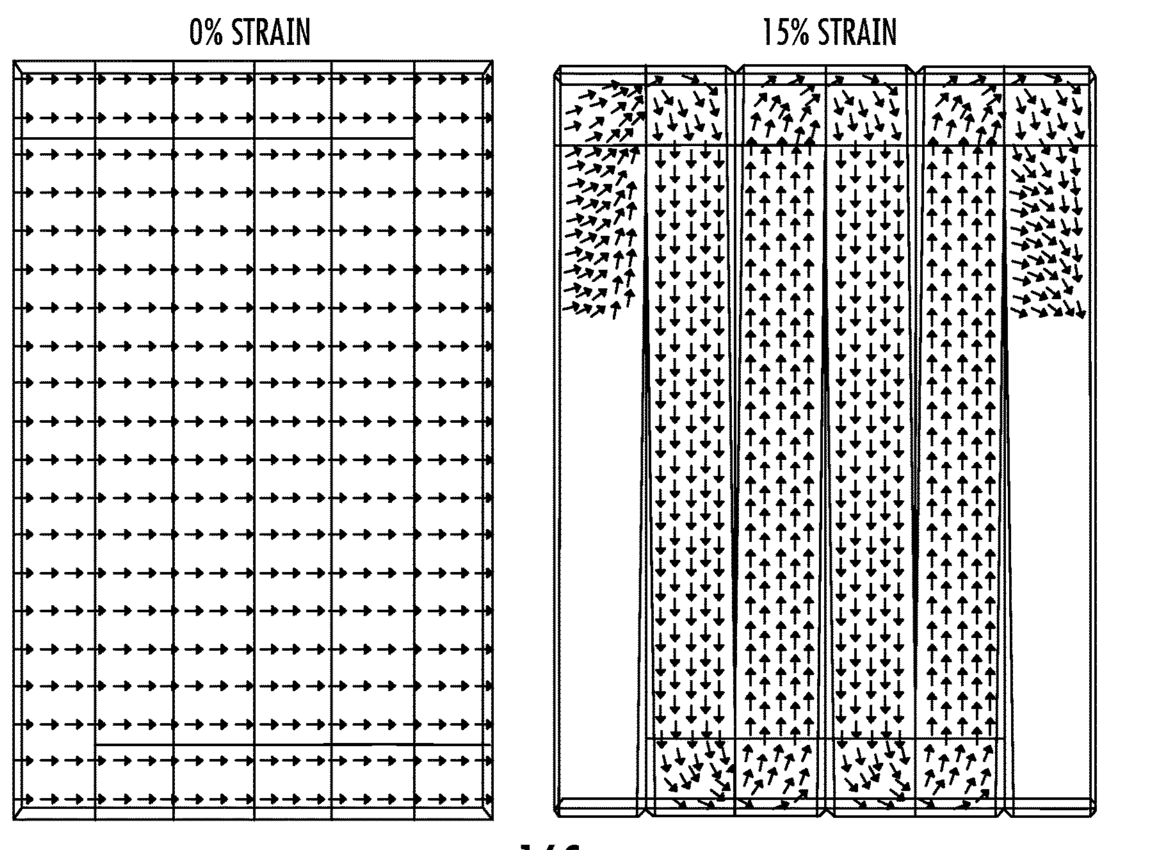
FIG. 16C

HIGHLY SENSITIVE, STRETCHABLE, AND ROBUST STRAIN SENSORS AND RELATED METHODS

PRIORITY CLAIM

This application claims the priority benefit of U.S. Provisional Patent Application Ser. No. 63/460,865, filed Apr. 20, 2023, the disclosure of which is incorporated herein by reference in its entirety.

GOVERNMENT SUPPORT

This invention was made with government support under grant number IIP2122841 awarded by the National Science Foundation. The government has certain rights in the invention.

TECHNICAL FIELD

The subject matter described herein relates to strain sensors and the manufacturing of the same. More specifically, the subject matter relates to strain sensors employing nanowire networks and crack propagation, opening and blunting.

SUMMARY

According to one aspect, the subject matter described herein relates to an exemplary method for producing a strain sensor using crack propagation, opening and blunting. An example method includes applying conductive nanowires to a substrate to form a conductive nanowire network on the substrate. The method also includes applying an elastomer to the nanowire network to form a composite layer with conductive nanowire network embedded in the elastomer and an elastomer layer on the composite layer. The method also includes removing the substrate from the conductive nanowire network, wherein removing the substrate at least partially exposes a surface of the conductive nanowire network. The method further includes cutting intervallic incisions in the surface of the conductive nanowire network, wherein the intervallic incisions extend alternatingly and inwardly from one of two opposing edges of the conductive nanowire network.

According to another aspect, the subject matter described herein relates to an exemplary strain sensor using crack propagation, opening and blunting. The strain sensor includes a composite layer with a conductive nanowire network embedded in an elastomer. The strain sensor further includes an elastomer layer on the composite layer. A surface of the conductive nanowire layer includes intervallic incisions extending alternatingly and inwardly from one of two opposing edges of the surface of the conductive nanowire layer.

BRIEF DESCRIPTION OF THE DRAWINGS

The subject matter described herein will now be explained with reference to the accompanying drawings of which:

FIG. 6A shows a schematic diagram of an integrated 3D touch sensor;

FIG. 6B shows a touch sensor connected to an evaluation board and laptop;

FIG. 6C is a graph showing decoupled responses when shear forces in four directions were applied sequentially;

FIG. 6D shows real-time control of an airplane in a video game with the functions of turning left, turning right, acceleration, and deceleration using a touch sensor;

FIG. 6E are snapshots showing different stages of grasping a glass of water including grabbing, lifting, and dropping with a touch sensor;

FIG. 6F is a chart showing shear and normal strains of two trials with different lifting and dropping speeds;

FIG. 9B shows an SEM image of cut surfaces of AgNW/PDMS composite with an AgNW density of 0.5 mg/cm$^2$;

FIG. 16A shows a strain sensor;

FIG. 16B is a graph comparing FEA and experimental results of the sensor with p/w=0.1, 0.2 and 0.3;

FIG. 16C shows electrical current densities of the strain sensor at zero and 15% strain depicts electromechanical simulation of the strain sensor;

DETAILED DESCRIPTION

Figure 1A:
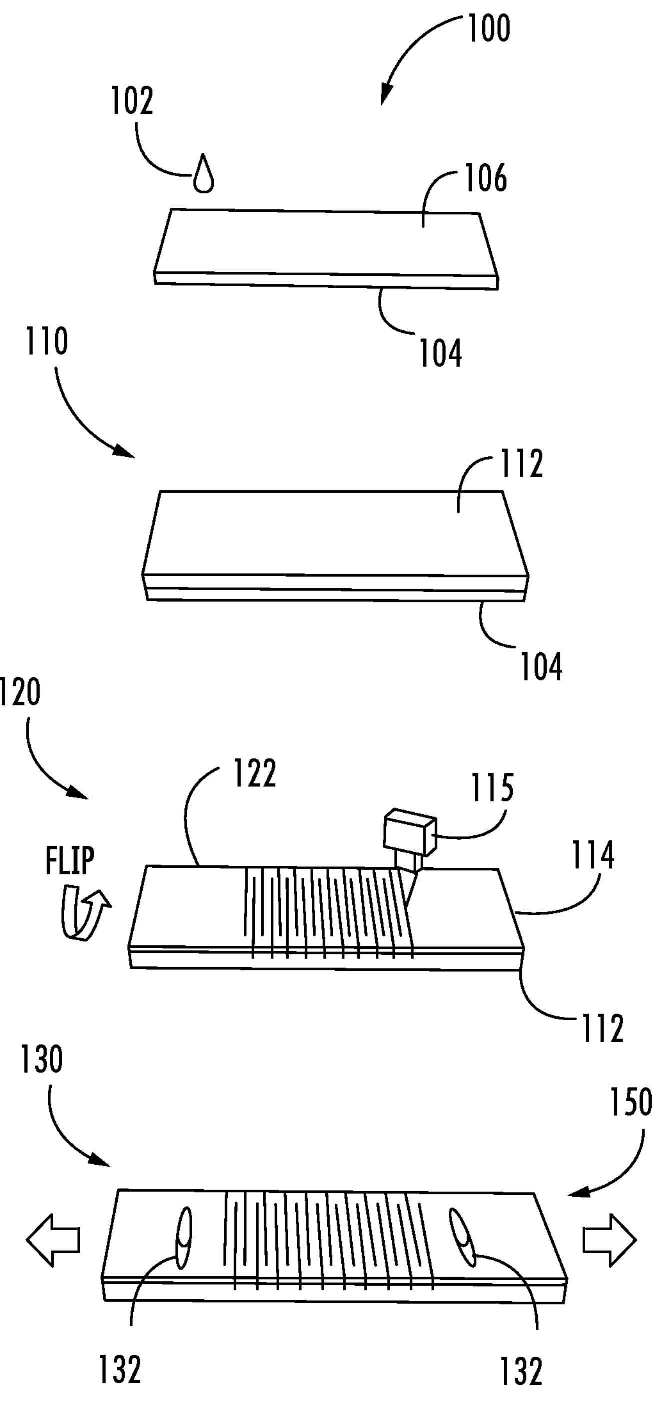
FIG. 1A shows an example fabrication process of a strain sensor.

It will be understood that various details of the presently disclosed subject matter may be changed without departing from the scope of the presently disclosed subject matter. Furthermore, the foregoing description is for the purpose of illustration only, and not for the purpose of limitation.

Soft and stretchable strain sensors have been attracting significant attention. However, the trade-off between the sensitivity (gauge factor) and the sensing range has been a major challenge. In this work, we report a soft stretchable resistive strain sensor with an unusual combination of high sensitivity, large sensing range, and high robustness. The sensor is made of a silver nanowire network embedded below the surface of an elastomeric matrix (e.g., poly (dimethylsiloxane)). Periodic mechanical cuts are applied to the top surface of the sensor, changing the current flow from uniformly across the sensor to along the conducting path defined by the open cracks. Both experiment and finite element analysis are conducted to study the effect of the slit depth, slit length, and pitch between the slits. The stretchable strain sensor can be integrated into wearable systems for monitoring physiological functions and body motions associated with different levels of strain, such as blood pressure and lower back health. Finally, a soft three-dimensional (3D) touch sensor that tracks both normal and shear stresses is developed for human-machine interfaces and tactile sensing for robotics.

INTRODUCTION

Soft and stretchable strain sensors have been attracting significant interest because of their wide applications in wearable electronics for physiological monitoring and motion tracking, human-machine interfaces, and soft robotics. A variety of nanocomposite materials have been explored for use in soft and stretchable sensors, including carbon nanotubes (CNTs), graphene, metal nanoparticles, magnetic nanoparticles, and metal nanowires. In stretchable strain sensors, these materials typically exist in the form of a three-dimensional percolation network embedded in a polymer matrix. Stretching the composite matrix decreases the percolation density, resulting in decreased electrical conductivity. In parallel, structural design strategies have been used to significantly reduce the effective strain on the conducting materials, leading to better stretchability. A number of mechanically guided structural designs have been reported, such as wrinkles, serpentines, spirals/helices, kirigami, and auxetic metamaterials.

Recent advancements in wearable technology and soft robotics have led to the development of new stretchable strain sensors with enhanced sensing performances, such as large gauge factor (GF), large strain range, high linearity, better conformability, and robustness. However, trade-offs between these performances have been a major challenge for almost all existing strain sensors. For example, a Pt/polyurethane acrylate (PUA) composite resistive sensor with surface crack design has been reported with an ultrahigh GF of 2000, yet a strain range of only 2%, which is low for most applications such as body motion tracking. Another crack-based strain sensor also shows good sensitivity (GF=9400) but with a small sensing range (<3%). These examples illustrate the promising potential of measuring contact resistance change between crack surfaces for strain sensing. However, using well-defined, periodic mechanical cuts in soft materials to control crack propagation and opening has not been explored. On the other hand, a highly stretchable capacitive strain sensor enabled by wrinkled gold films showed a strain range of 250% but a GF of only 0.9, which limits the sensing capabilities for small strains. Some researchers have also developed sensors with a large strain range (450-500%) and high sensitivity (GF of 67.7-10,000). But they typically showed a nonlinear response (smaller GF at low strains and large GF at higher strains).

For monitoring of human physiology and motion, the skin strain ranges from less than 1% to over 50%. Typically, one sensor is used to detect subtle strains associated with physiological functions (e.g., blood pulse and respiration), while another is used for large strains associated with bending of body parts (e.g., knee, elbow, and back). It would be of great interest to develop one strain sensor, in the form of either a skin patch or a textile band, which can capture the full range of strains on human skin and can thus be attached onto different parts of the body. For monitoring certain diseases, it is indeed critical to accurately measure a wide range of strains. For example, in the case of Parkinson's disease, the symptoms include resting tremor, rigid muscles, bradykinesia, and sometimes a combination of the above. The sensors must be sensitive enough for monitoring small tremors while maintaining a large sensing range to measure joint movements. Moreover, soft strain sensors may encounter adverse conditions during operation, such as impacts and overextension, where the applied strain could substantially exceed the sensing range. Therefore, it is of important relevance to develop a stretchable strain sensor with high sensitivity, large sensing range, and high robustness (i.e., surviving overstrain and repeatability), which remains a significant challenge.

This work reports a soft stretchable resistive strain sensor that can achieve all three goals by combining the use of nanomaterials with a novel structural design strategy. The sensor is made of a silver nanowire (AgNW) network embedded below the surface of poly(dimethylsiloxane) (PDMS). Periodic mechanical cuts are applied to the top surface of the AgNW/PDMS composite, changing the current flow from uniformly across the sensor to along the conducting path defined by the open cracks. Under the applied strain, the resistance increases as the crack propagates but remains constant as the crack reaches the cut length and exhibits tip blunting. Both regions are totally reversible and repeatable. Both experiment and finite element analysis have been conducted to study the effect of the cut depth, cut length, and pitch between the cuts, highlighting excellent tunability of the GF, sensing range, and reversible range of the sensor. The stretchable strain sensor was integrated into two systems for wearable monitoring of blood pressure and lower back health, demonstrating the capabilities for small-strain and large-strain sensing, respectively. Finally, a soft three-dimensional (3D) touch sensor that tracks both normal and shear stresses was developed for human-machine interfaces and tactile sensing for robotics.

Results

Figure 1B:
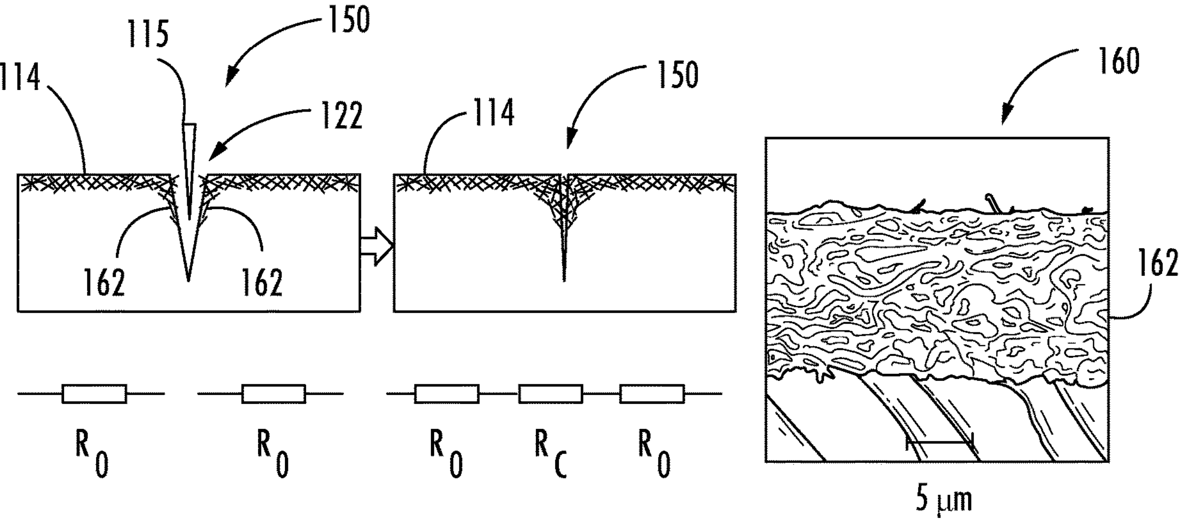
FIG. 1B shows an elastomer layer and a composite layer of a strain sensor during and after mechanical cuts and a scanning electron microscopy (SEM) image showing a cross-sectional view of a cut surface.

FIG. 1A shows an example fabrication process of a strain sensor 150 with a surface crack design. At step 100, a nanowire solution 102 is deposited onto a sacrificial substrate 104. In this example, nanowire solution 102 includes an AgNW solution, which is drop-cast on sacrificial substrate 104 and then heated to evaporate the solvent in the nanowire solution 102, resulting in a nanowire film 106 on the sacrificial substrate 104. At step 110, an elastomer, for example PDMS, was applied to the exposed side of nanowire film 104 opposite sacrificial substrate 104. In the example method in which the elastomer includes PDMS, liquid PDMS precursor was mixed thoroughly and spin-coated on top of nanowire film 106, which includes a nanowire network such as an AgNW network. The AgNW/PDMS composite was cured at 70° C. for 1 hour, forming an elastomer layer 112 comprising PDMS and a composite layer 114 of the AgNW embedded in the PDMS. At step 120, the cured sample was then peeled off from sacrificial substrate 104 with the AgNW network embedded below the surface of the PDMS matrix. Then, composite layer 114 was cut from the AgNW side using a mechanical cutter 115, cutting through the AgNW/PDMS composite into the pure elastomer 112 layer comprising PDMS to form intervallic incisions 122, as also shown in FIG. 1B. The AgNW/PDMS layer was cut into a zigzag-shaped pattern. At step 130, electrical leads 132 comprising copper wires were attached to the two ends of the pattern by silver epoxy.

Figure 1C:
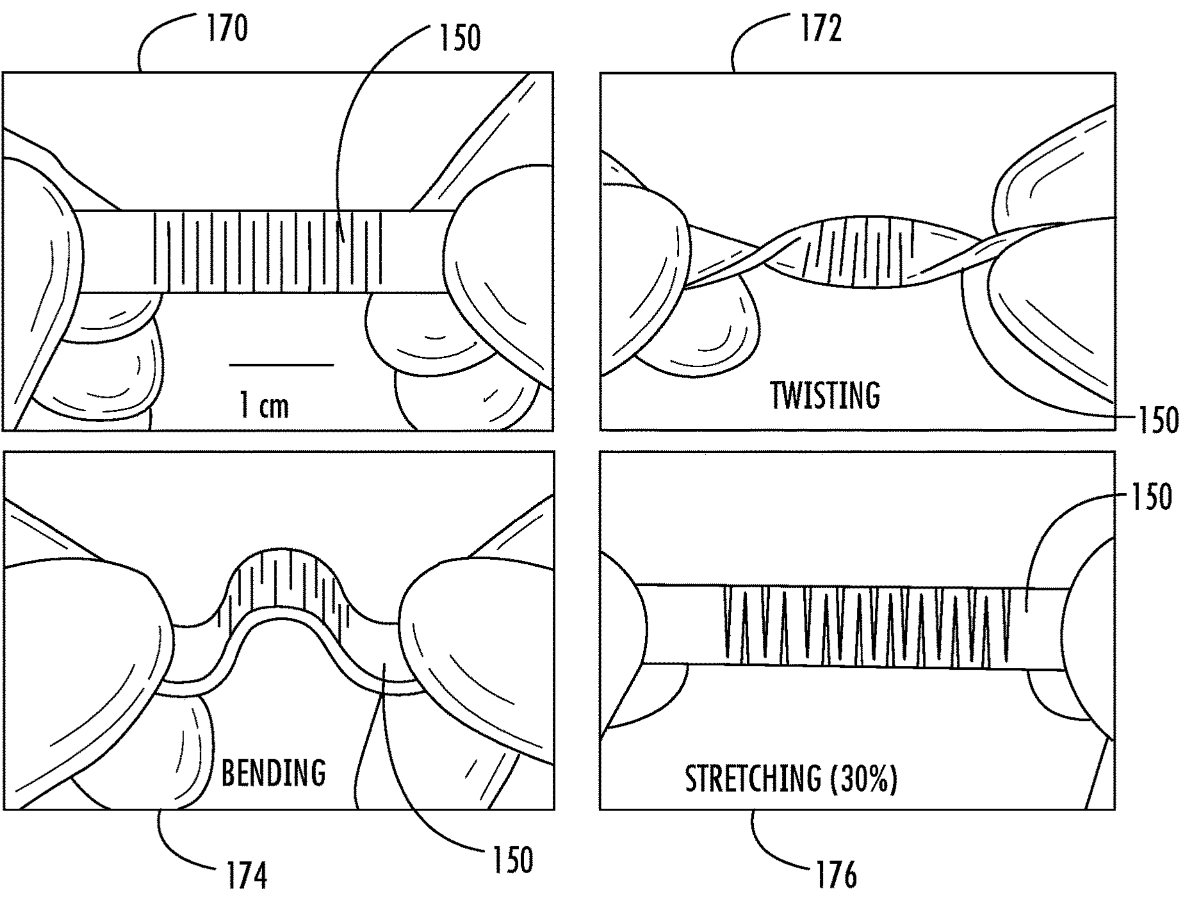
FIG. 1C shows images of a strain sensor undeformed, twisted, bent, and stretched.

FIG. 1B shows elastomer layer 112 and composite layer 114 of strain sensor 150 during and after the mechanical cuts that form intervallic incisions 122. $2R_0$ is the initial resistance of strain sensor 150 prior to the cuts. As the mechanical cutter 115 cuts through the AgNW/PDMS composite, AgNW along the cutting path is broken and pushed in. After retrieval of the blade, the AgNW on the two cut surfaces 162 form a physical contact with the contact resistance of $R_c$. The scanning electron microscopy (SEM) image 160 shows a cross-sectional view of cut surface 162. FIG. 1C shows strain sensor 150 undeformed in image 170, twisted in image 172, bent in image 174, and stretched in image 176 under a 30% strain.

Figure 8:
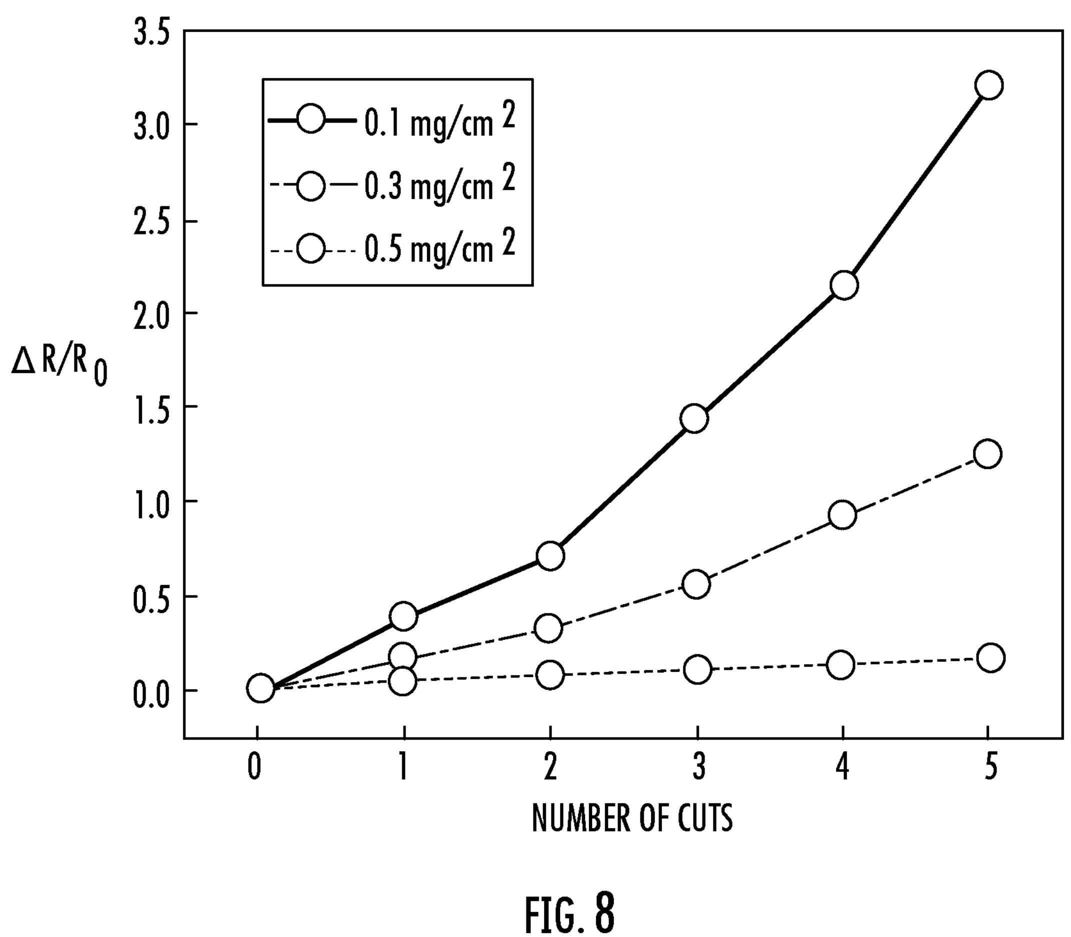
FIG. 8 is a graph illustrating the resistance change of AgNW/PDMS composites with increase of the number of cuts.
Figures 9A, 9B:
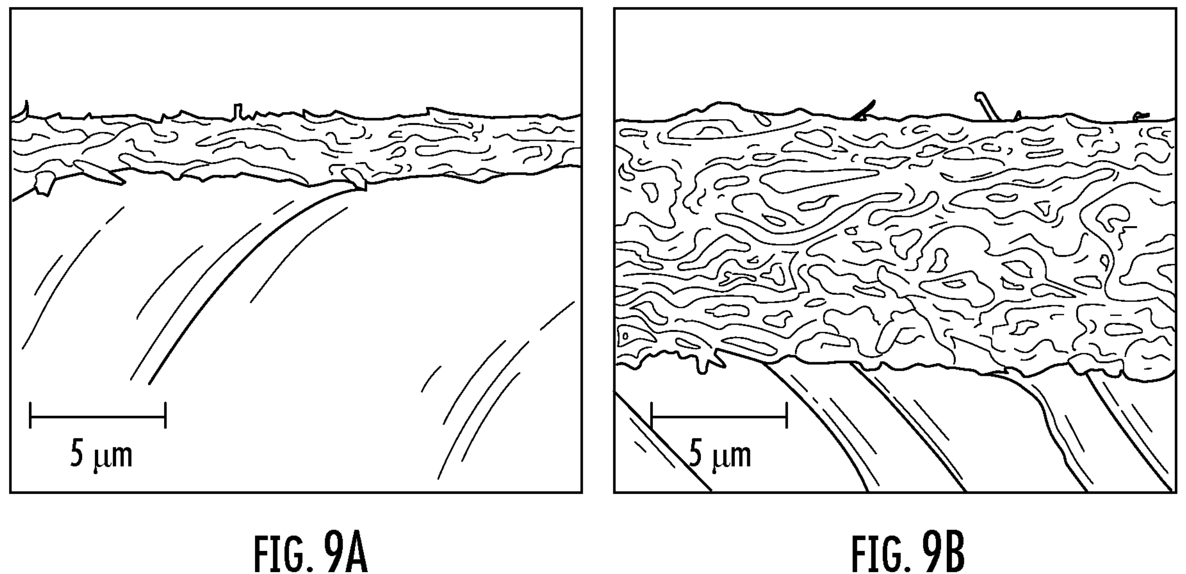
FIGS. 9A and 9B shows an SEM image of cut surfaces of AgNW/PDMS composite with an AgNW density of 0.1 mg/cm$^2$.
Figure 10:
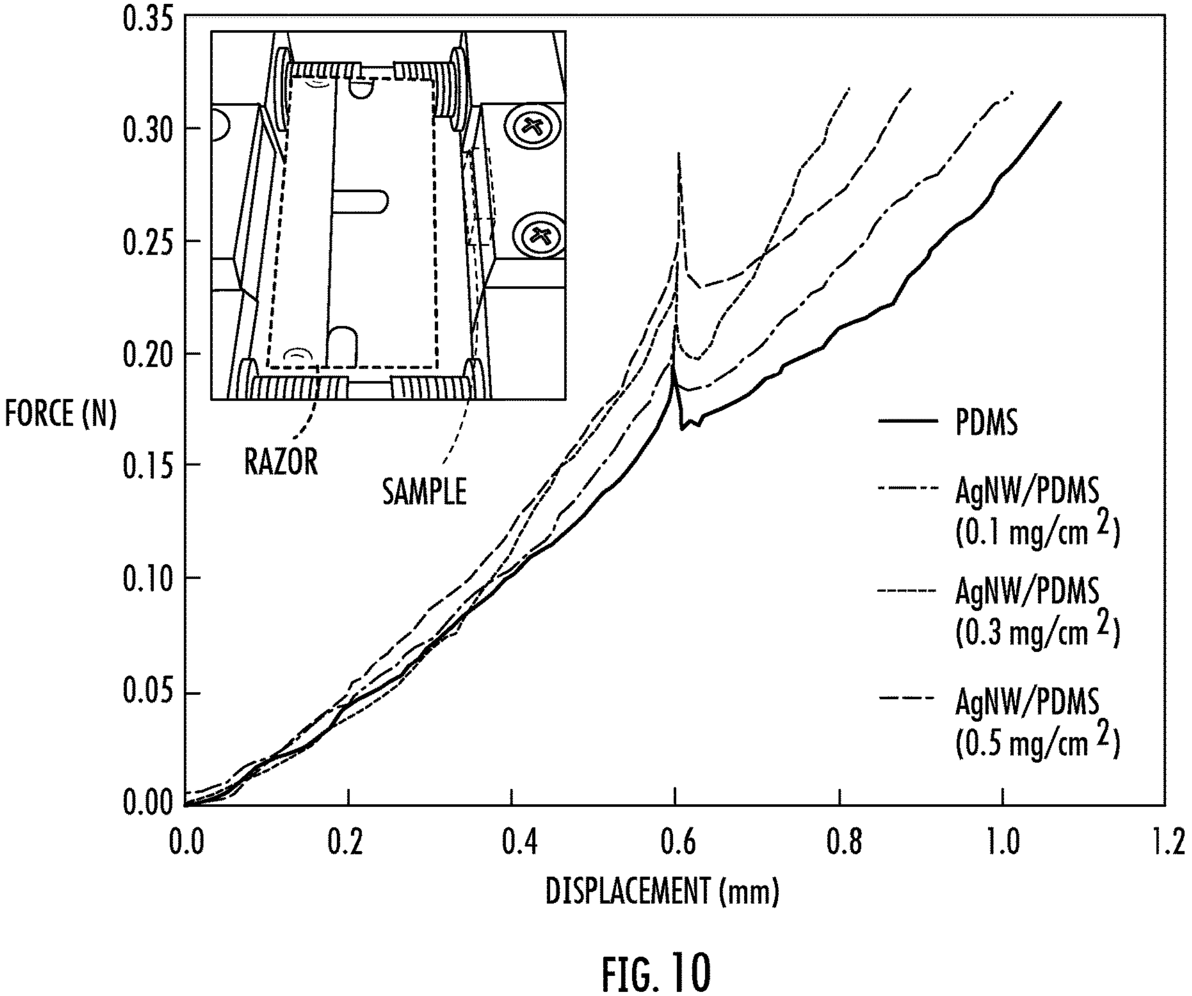
FIG. 10 is a graph illustrating force-displacement curves of a razor blade pushing into the AgNW/PDMS composites of different AgNW densities.

FIG. 8 shows the resistance changes of the AgNW/PDMS composite samples of different AgNW densities with respect to the number of slits. All samples showed a gradual increase in resistance with the increasing number of slits. The sample with an AgNW density of 0.5 mg/cm$^2$ yielded a minimum resistance change of only 15.3% after 5 cuts, while the sample with an AgNW density of 0.1 mg/cm$^2$ showed a resistance change of 321.9%. This can be explained by the different fracture mechanisms in the two cases. From FIG. 9A, the low-density sample showed a clean-cut surface with AgNWs along the cutting path broken and sticking out. The depth of the conductive contact surface in this case was about 3 μm. However, for the sample with a high-density AgNW network, the AgNW/PDMS composite was deformed and pushed inward. In the case of 0.5 mg/cm$^2$, the depth of the conductive contact surface was over 13 μm (FIG. 9B). This large contact area enabled the resistance change to be as low as 5% after each slit. In the rest of this work, 0.5 mg/cm$^2$ AgNW density was chosen for all of the strain sensors due to their stable contact resistances. The force-displacement curves of the samples with different AgNW densities are shown in FIG. 10. It can be seen that a higher cutting force is required to break through the composite layer with a higher AgNW density. With the increase in the applied strain, the crack gradually propagated, which caused $R_c$ to increase; inversely, with a decrease in the applied strain, the crack retracted, leading to a decrease in $R_c$. The electromechanical response of the sensor is highly reversible under cyclic loading, as discussed with reference to FIGS. 2B-2C.

Figure 2A:
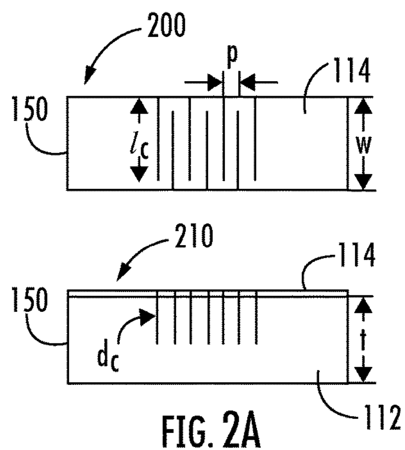
FIG. 2A shows a top view and a side view of a strain sensor.
Figure 2B:
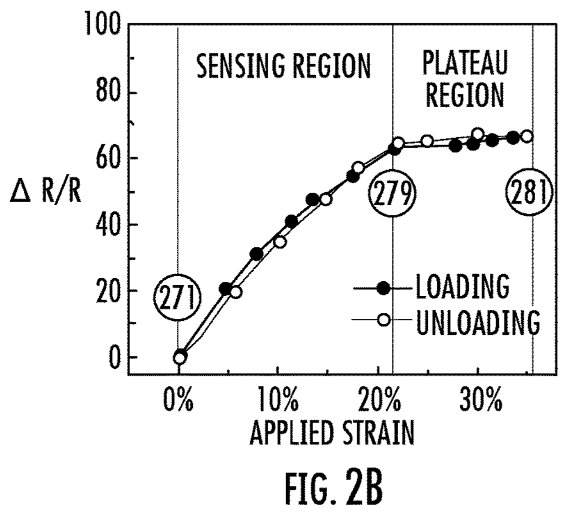
FIG. 2B is a chart showing the resistance change of the strain sensor as a function of an applied strain.
Figure 2C:
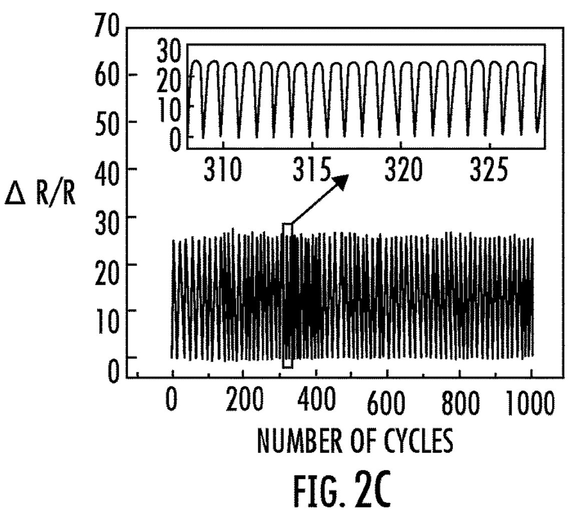
FIG. 2C is a chart showing the number of stretching/unloading cycles applied to the strain sensor.
Figure 11A:
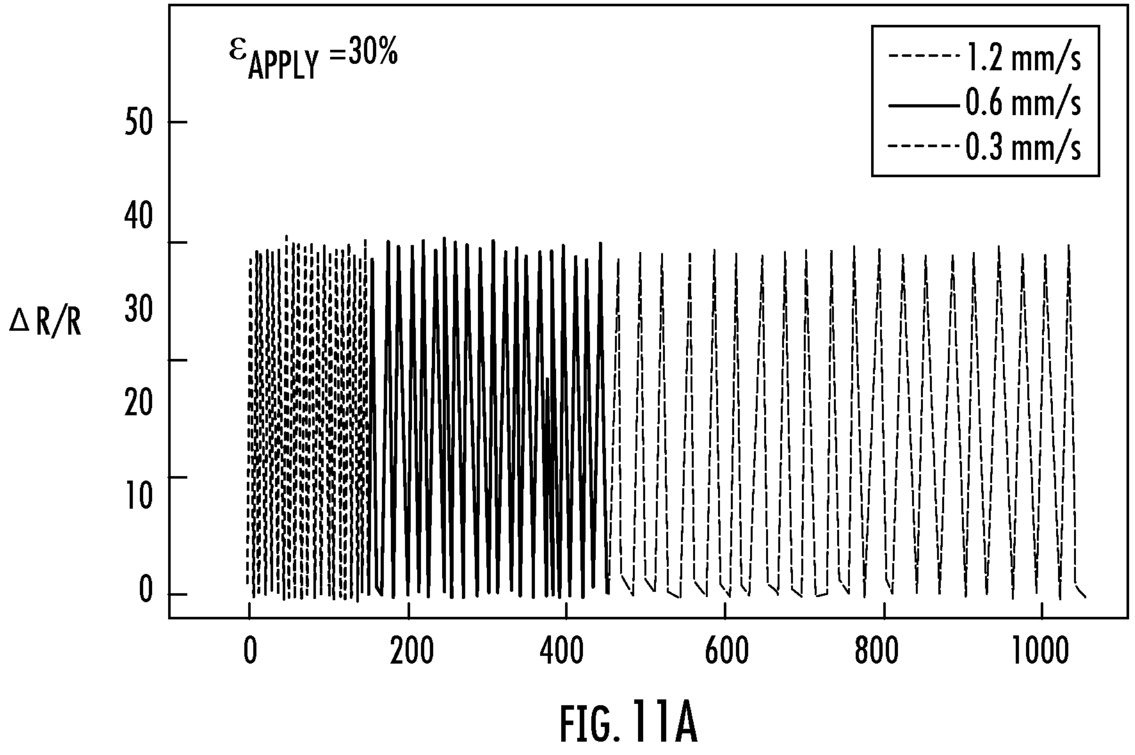
FIG. 11A is a graph illustrating resistance of the strain sensor under 20 cycles of loading and unloading with the applied strain of 30% at different strain rates.
Figure 11B:
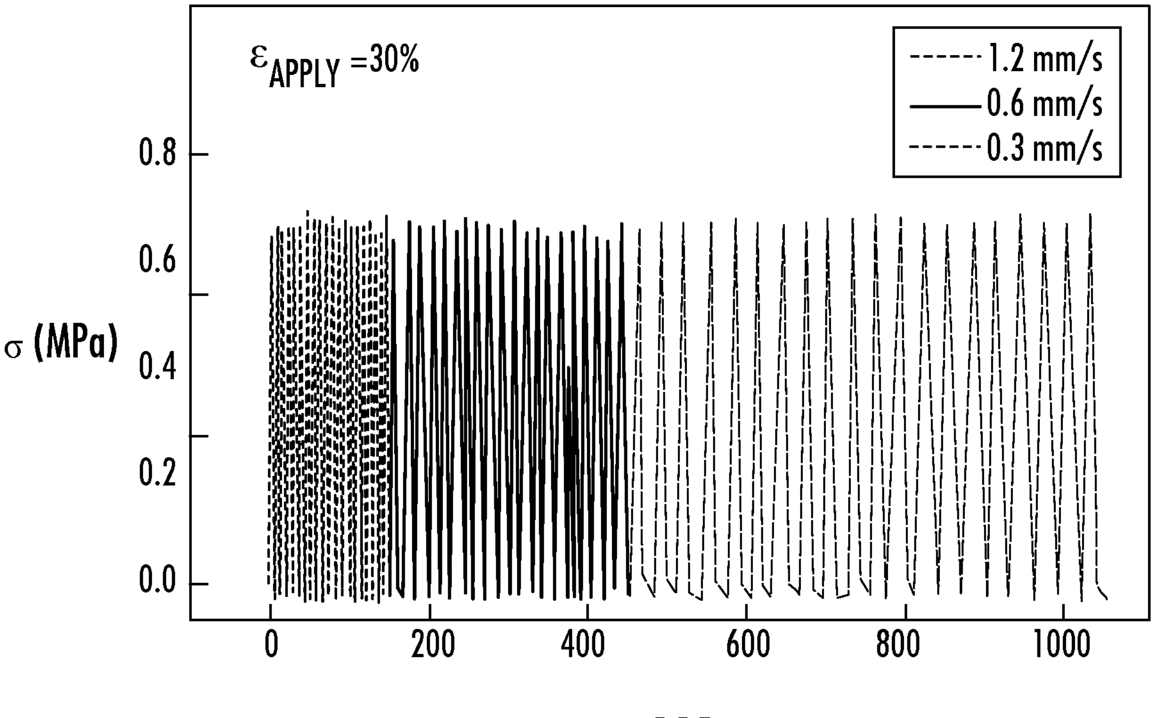
FIG. 11B is a graph illustrating stress of the strain sensor under 20 cycles of loading and unloading with the applied strain of 30% at different strain rates.

FIG. 2A shows a top view 200 and a side view 210 of strain sensor 150. FIG. 2A shows the pitch between incisions p, incision length $l_c$, specimen width w, slit depth $d_c$, and specimen thickness t. As shown in side view 210, the incisions extend beyond composition layer 114 and partly into elastomer layer 112. To study the electrical performance of the sensors for different geometrical designs, we defined three major geometrical parameters—ratio of the slit depth to the sample thickness $d_c/t$, ratio of the pitch between the slits to the specimen width p/w, and ratio of the slit length to the specimen width $l_c/w$. FIG. 2B is a chart showing the resistance change of the strain sensor as a function of an applied strain. The resistance change curve can be divided into two regions, a sensing region where the resistance increases linearly with the increasing strain, and a plateau region. As shown in FIG. 2B, the sensing region ranges from strain 271 with a 0% strain to about strain 279 with a strain of 22.7%, and the plateau region ranges from about strain 279 and greater. The crack propagation/opening/blunting process was observed in situ under an optical microscope, while the resistance was measured simultaneously. FIG. 2C is a chart showing the number of stretching/unloading cycles applied to the strain sensor. One thousand stretching/unloading cycles of 30% applied strain (1.2 mm/s) were applied. The inset shows 20 cycles to show the excellent repeatability of the strain sensor for long-term use. FIG. 11A and FIG. 11B show the resistance change and the stress of the sensor, measured concurrently and in megapascals (MPa), under cyclic loading at different strain rates (1.2, 0.6, and 0.3 mm/s), which shows good repeatability in all cases.

Figure 2D:
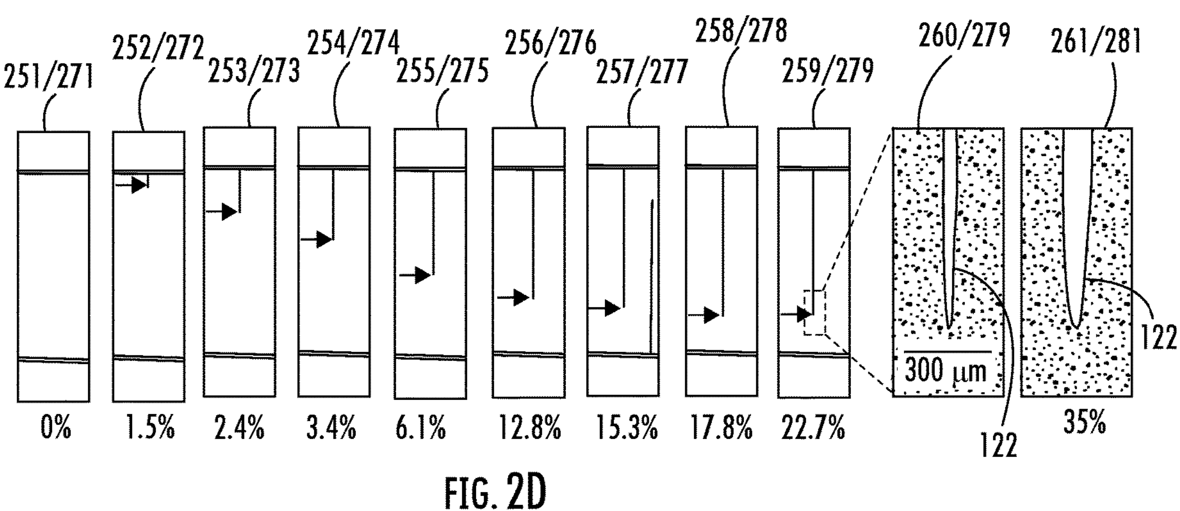
FIG. 2D shows gradual propagation of a single crack/incision in the strain sensor.
Figure 12A:
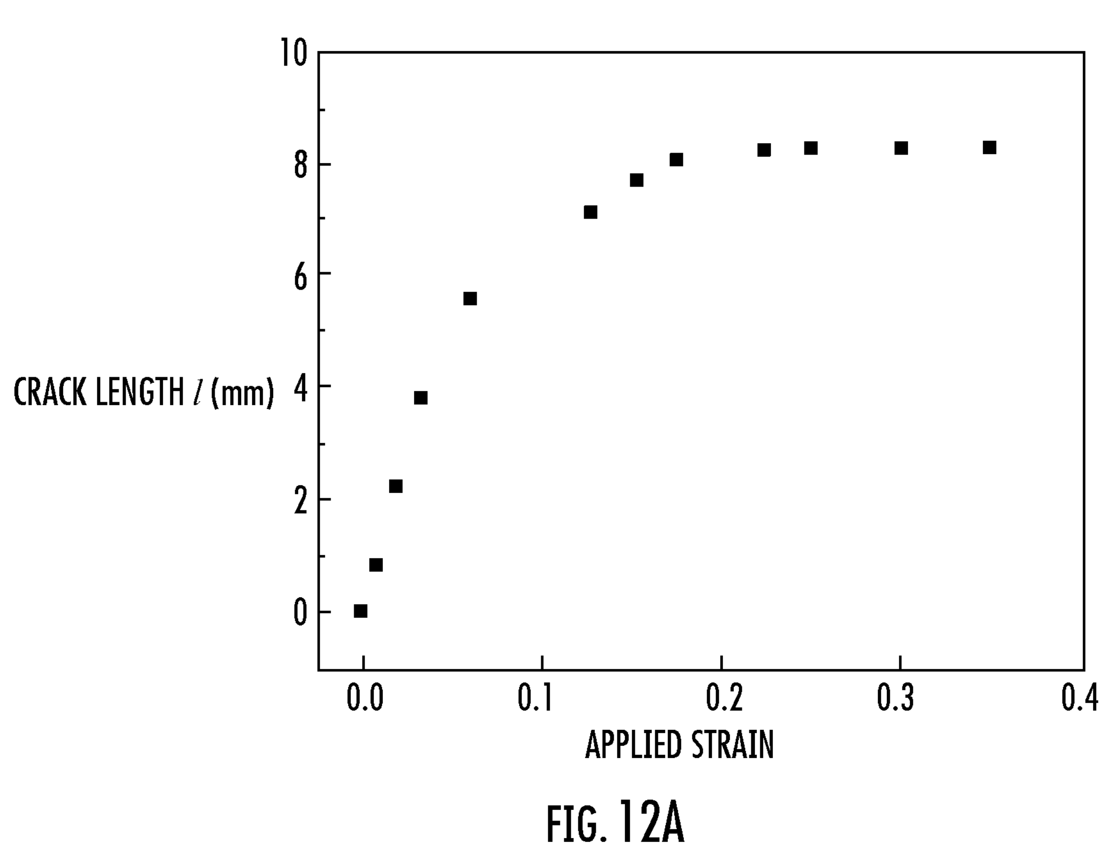
FIG. 12A is a graph illustrating crack length with respect to applied strain.
Figure 12B:
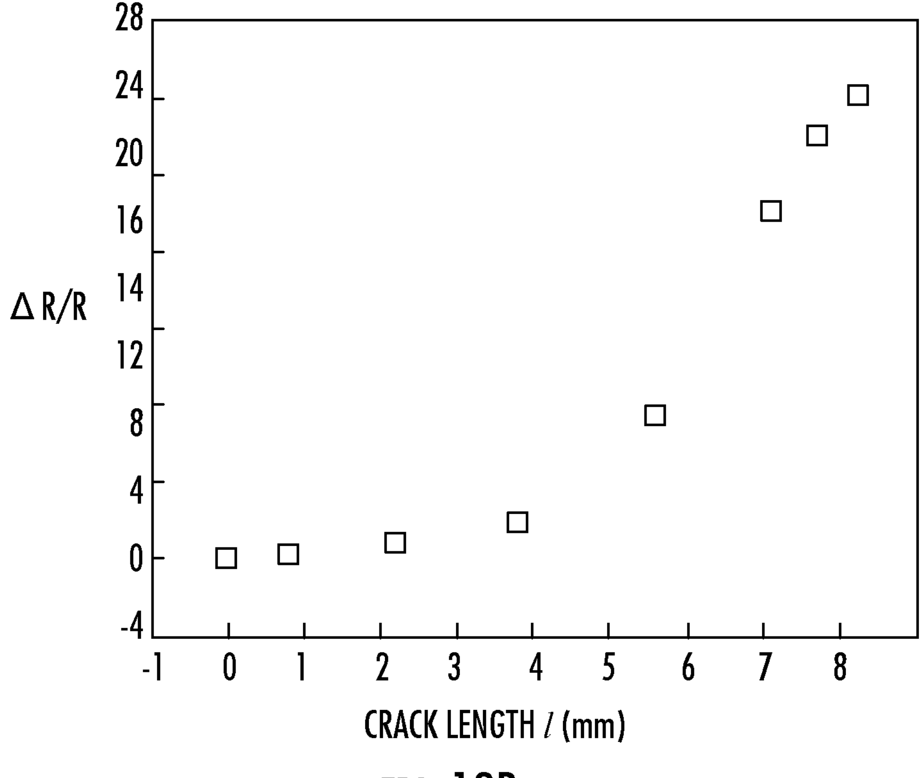
FIG. 12B is a graph illustrating relative resistance changes with respect to crack length.

FIG. 2D shows gradual propagation of a single crack/incision in the strain sensor in images 251-259, wherein strain 271 of 0%, strain 272 of 1.5%, strain 273 of 2.4%, strain 274 of 3.4%, strain 275 of 6.1%, strain 276 of 12.8%, strain 277 of 15.3%, strain 278 of 17.8%, and strain 279 of 22.7% are applied to the strain sensor, respectively. FIG. 2D shows the crack at intervallic incision 122 opening and tip blunting during applied strain. Image 260 is a magnified view of the tip of intervallic incision 122 in image 259 with applied strain 279 of 22.7%. In this range, the current flow follows the slit-guided path. As a result, the resistance of the sensor increases with the crack propagating. However, this resistance change stops when the crack from intervallic incision 122 is fully open, i.e., the two crack surfaces lose contact, as shown in the magnified image 261 with applied strain 281 of 35%. FIG. 12A and FIG. 12B also show the relationship between the applied strain, the crack length, and the relative resistance change.

The sensor can be further stretched without resistance change, as shown in the plateau region in FIG. 2B. In this case, the crack reaches the full slit length. Under the applied strain, the crack further opens with the crack tip blunting but not advancing beyond the slit length. This plateau region is important as it can protect the sensors from failing due to unexpected large strains. Here we define this reversible range by the combination of the sensing region and the plateau region. Beyond the plateau region, the local strain in front of the crack tip would cause irreversible sliding in the AgNW network, leading to overall irreversible resistance change. If the applied strain further increases, the crack tip could propagate beyond the slit length, causing more serious irreversibility in the resistance.

Figure 3A:
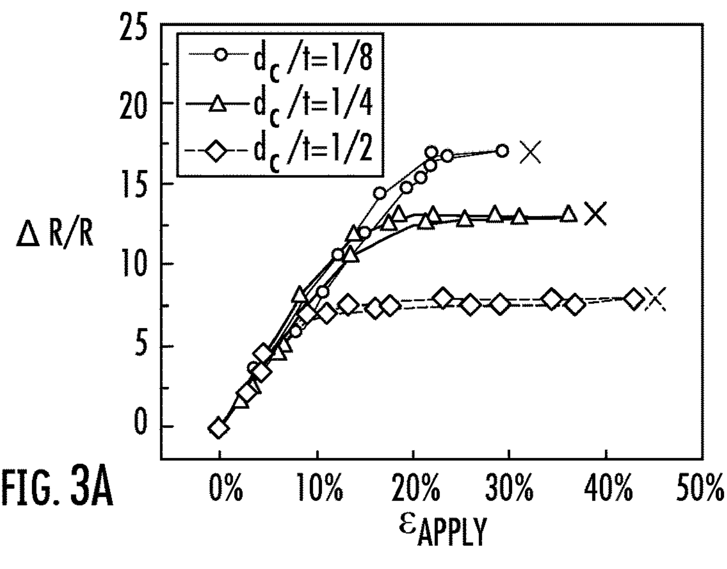
FIG. 3A is a chart showing the relative resistance changes of strain sensors of varying thickness incision depth.
Figure 3B:
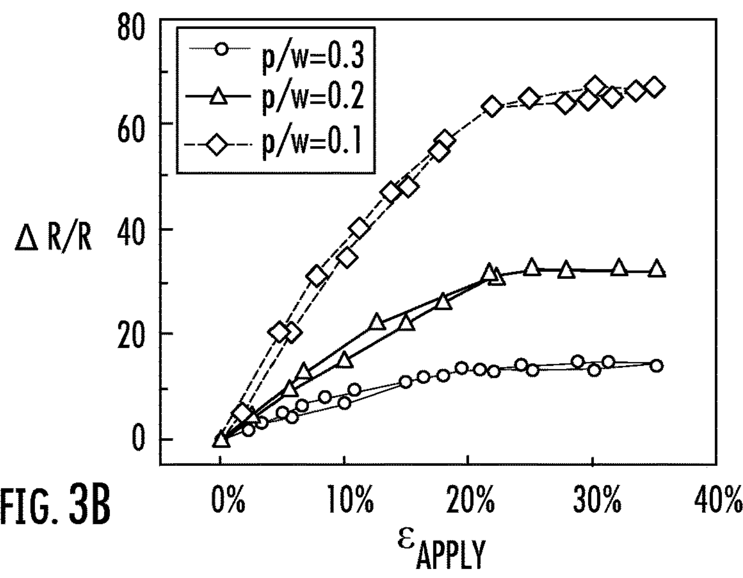
FIG. 3B is a chart showing the effect of resistance changes with incision pitch and strain sensor width.
Figure 3C:
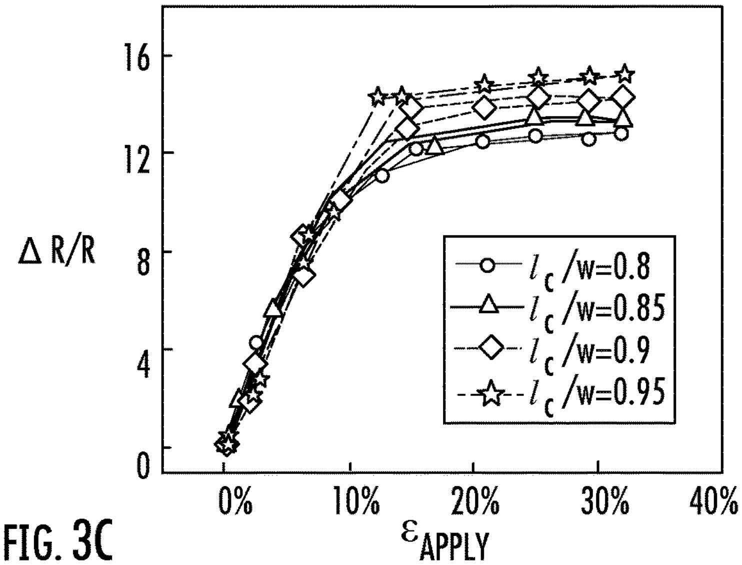
FIG. 3C is a chart showing the effect of resistance changes with incision length and strain sensor width.

FIGS. 3A-3C show graphs depicting geometrical design of the strain sensor. Three cross markers with represent the reversible range of each case from finite element analysis (FEA). FIG. 3A is a chart showing the relative resistance changes of strain sensors of varying thickness incision depth. FIG. 3A shows the relative resistance changes of three samples with $d_c/t$ of ⅛, ¼, and ½, with p, w, and $l_c$ remaining the same (p/w=0.2, $l_c/w=0.9$). The three cases showed the same GF of 81.5 and the linear sensing region gradually increased with the decreasing slit depth. This is due to the difference in the crack propagation rate for the different slit depths. The shallower the slits, the larger the applied strain to complete the crack propagation and opening. The plateau region gradually decreased with the decreasing slit depth shown in FIG. 2D.

Figure 13:
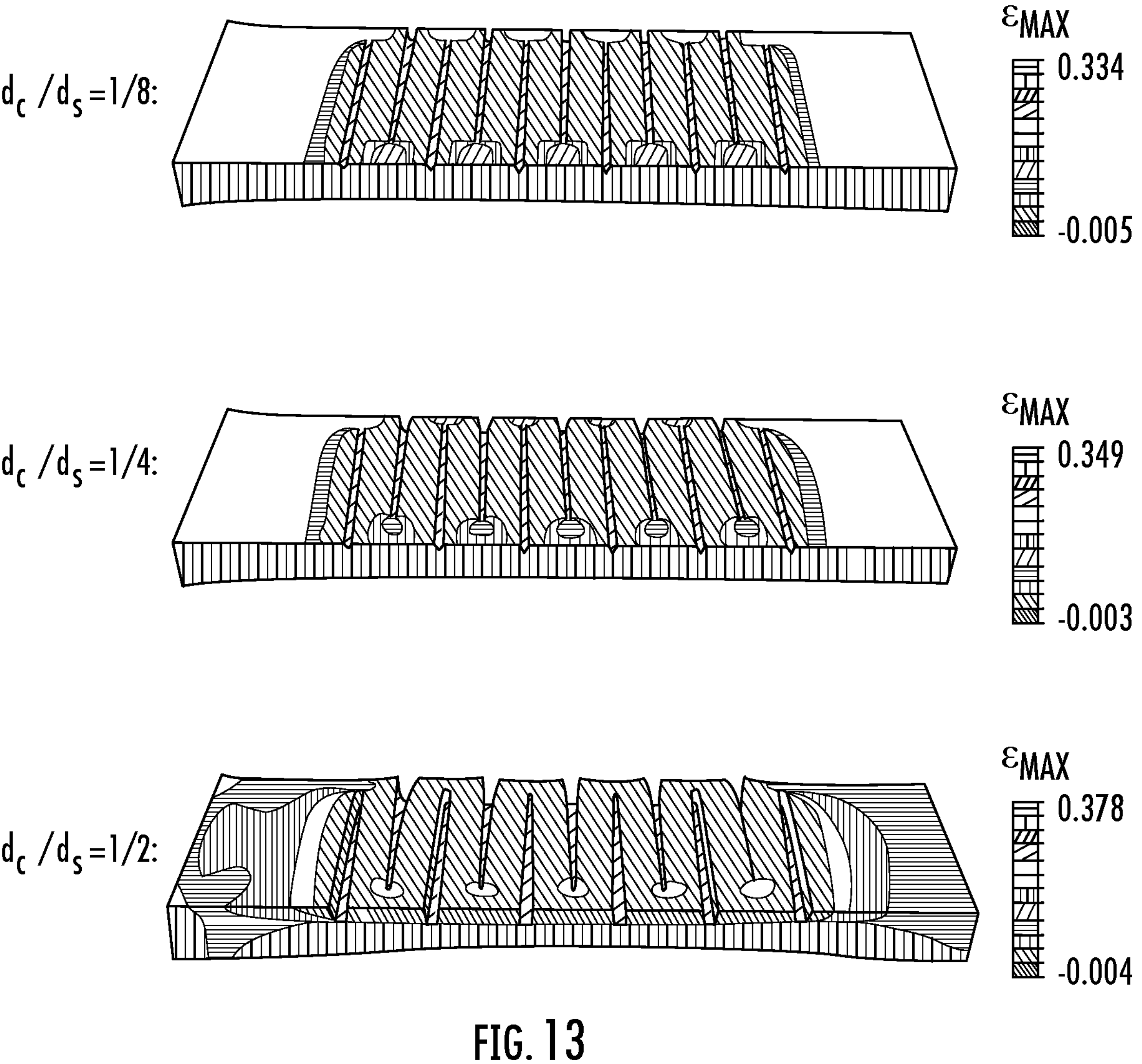
FIG. 13 depicts FEA simulation of the strain distribution of a strain sensor under 30% applied strain.
Figures 14A, 14B, 14C:
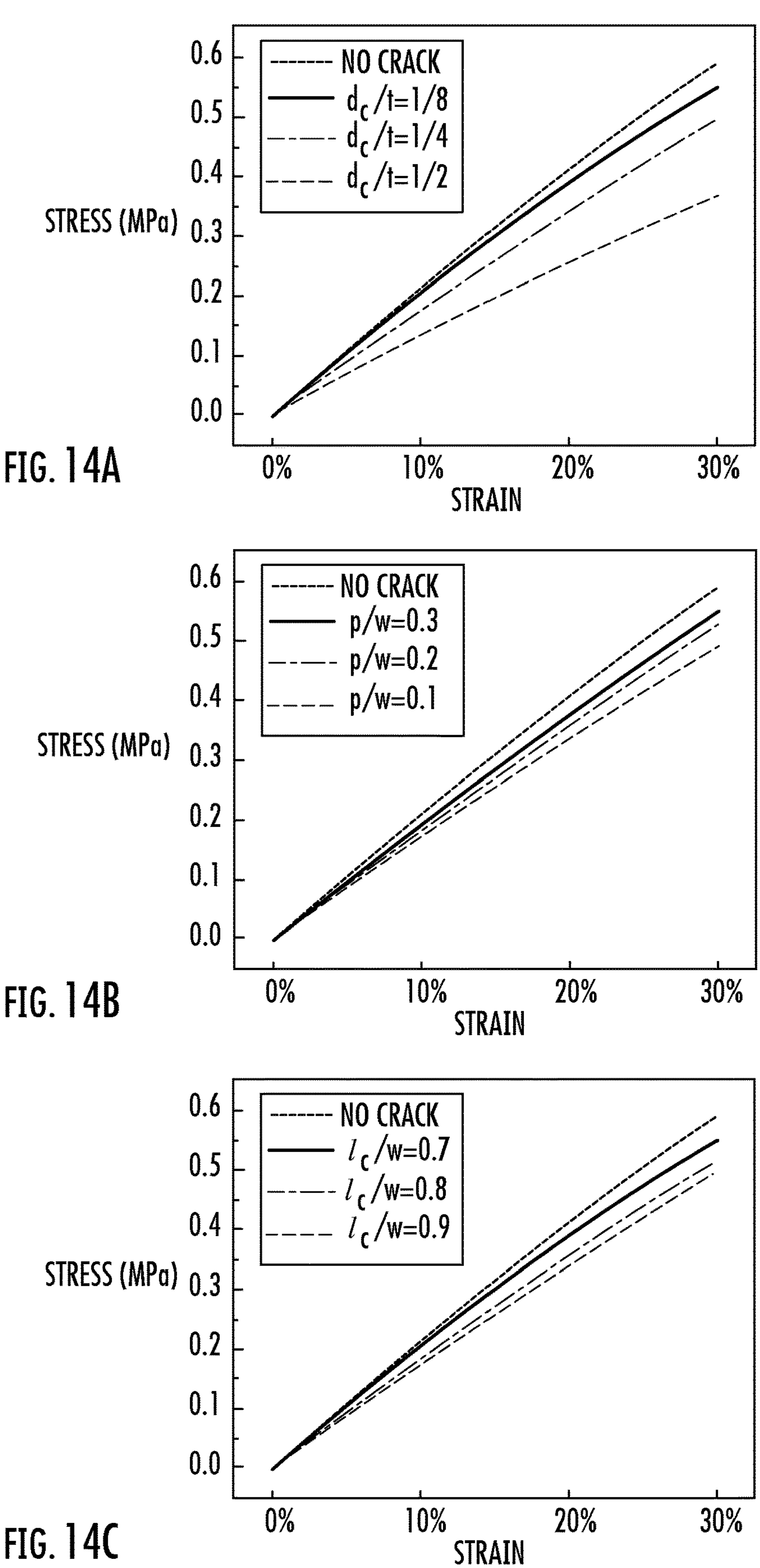
FIG. 14A is a graph illustrating FEA results of the stress-strain curve of a strain sensor with different $d_c/t$ compared to a strain sensor without cuts.
FIG. 14B is a graph illustrating FEA results of the stress-strain curve of a strain sensor with different p/w compared to a strain sensor without cuts.
FIG. 14C is a graph illustrating FEA results of the stress-strain curve of a strain sensor with different $l_c/w$ compared to a strain sensor without.
Figure 15:
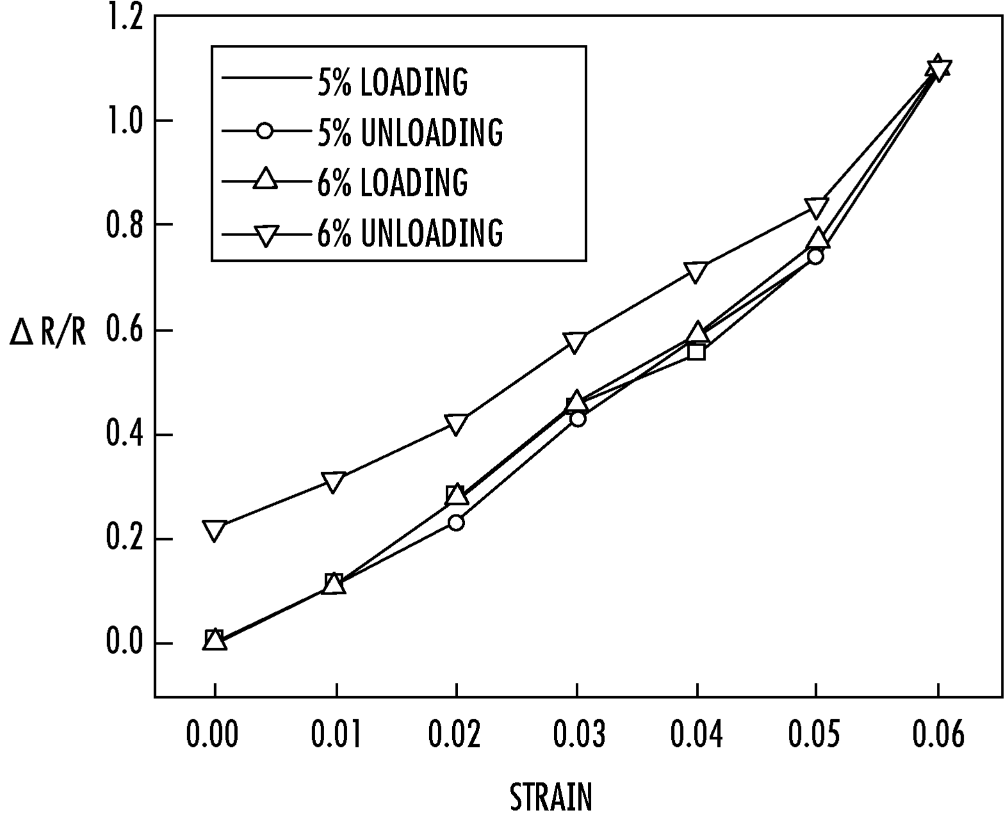
FIG. 15 is a graph illustrating resistance changes of the AgNW/PDMS composite under 5% and 6% stretching-and-unloading.

In FIG. 13, finite element analysis (FEA) (ABAQUS, version 2017) was conducted to simulate the crack propagation and opening behavior of the AgNW/PDMS composite. With the introduction of mechanical cuts, the effective modulus reduces. With larger dc/t, the effective modulus reduces more. Similarly, with smaller p/w and larger $l_c/w$, the effective modulus drop of the sensor increases (FIG. 14A-14C). The maximum strain in the AgNW/PDMS layer lies ahead of the crack tip during stretching. When it exceeds a critical strain Sc, we assume that the irreversible sliding in the AgNW network occurs, causing irreversible damage in the AgNW network and hence the irreversible resistance of the sensor. The critical strain on AgNW/PDMS composite was measured to be $\varepsilon_c$=5% under tension. As shown in FIG. 15, the resistance of the AgNW beyond 5% tensile strain was irreversible. Here, we characterize the reversible range by the applied strain when the maximum strain at the crack tip of the AgNW/PDMS layer reaches 5%. FEA simulations found the reversible ranges of 31.4, 38.3, and 45.1% for $d_c/t$ of ⅛, ¼, and ½, respectively (marked with cross marks in FIG. 3A). To guarantee the reversibility of the sensor, the applied strain remains below the reversible range, which is much smaller than the breaking strain; above the breaking strain, the crack would further advance beyond the initial slit length. To sum up, with different slit depths, a trade-off exists between the sensing range and the reversible range while having the same GF.

FIG. 3B shows the effect of resistance changes with incision pitch and strain sensor width. FIG. 3B shows the effect of p/w on the relative resistance change, while dc/t and $l_c/w$ remained at ⅛ and 0.9, respectively. With the decrease of p/w from 0.3 to 0.1, the GF increased from 81.5 to 290.1. With a smaller p/w, the pitch between the slits decreases while the total length of the conducting path increases, thus the overall resistance change can increase dramatically. FIG. 3C is a chart showing the effect of resistance changes with incision length and strain sensor width. FIG. 3C shows a slight increase of the resistance change with the increasing $l_c/w$ while keeping $d_c/t$=⅛ and p/w=0.3 because the final "neck" of the conducting path after the crack propagation completes is narrower with the increase of $l_c/w$. These results on the three parameters, $d_c/t$, p/w, and $l_c/w$, demonstrated excellent tunability of the GF, sensing range, and reversible range of the sensor.

Figure 4:
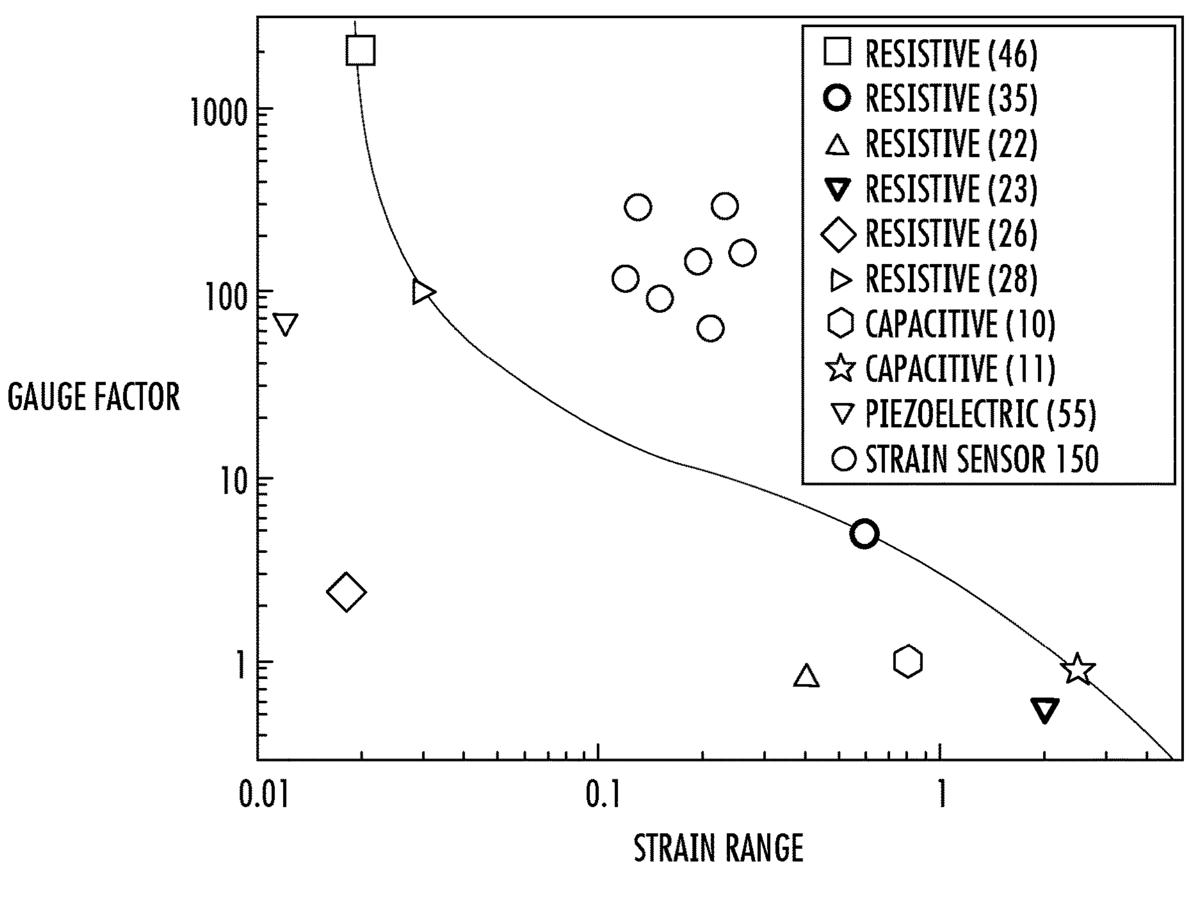
FIG. 4 is a graph illustrating performances of a strain sensor compared with other sensors.

FIG. 4 is a graph illustrating performances of a strain sensor compared with other sensors. FIG. 4 shows a benchmark comparison between strain sensor 150 and other stretchable strain sensors enabled by different sensing mechanisms, including resistive sensors capacitive sensors, and piezoelectric sensors. Of note is that the selected strain sensors in the map all showed high linearity and reversibility. In general, a tradeoff exists between the GF and the sensing range for stretchable strain sensors. From this map, it can be seen that the present work yields a large GF=290.1 with a decent strain sensing range (22%), exceeding the envelop defined by the reported stretchable strain sensors. After integration on stretchable substrates (e.g., athletic tape to be discussed later), the stretchability of the sensor can be further enhanced.

A coupled electromechanical FEA model was built (COMSOL Multiphysics 5.6) to understand the resistance change of the strain sensor under stretching (FIG. 16A). The AgNW/PDMS composite was modeled as an isotropic conductive material and the contact resistance between the two crack surfaces was considered to be dependent on the crack opening. When the distance between the two surfaces exceeds a critical value, the contact resistance drops from an initial value to zero. This model can simulate the gradual propagation and opening of the crack. Material parameters used in the simulation such as sheet resistance of the AgNW/PDMS composite and contact resistance were measured (e.g., in the case of NW density of 0.5 mg/cm$^2$, the sheet resistance of the AgNW/PDMS composite is 0.25 Ω/sq and the contact resistance per unit length is 1.6 Ω/cm). By taking the integral of the ECD along the conducting path we can calculate the resistance change with respect to the applied strain. The FEA results agreed well with the experimental results of different p/w ratios (FIG. 16B). FIG. 16C shows the simulated electrical current density (ECD) field of the strain sensor before and after stretching. With the increase of the applied strain, the ECD field shows a transition from uniform current flow (across the closed cracks) to current flow along the conducting path defined by the open cracks. This model could predict the performance of the sensors with even more complicated cutting patterns, providing valuable guidance to the sensor design.

Figures 5A, 5B, 5C, 5D:
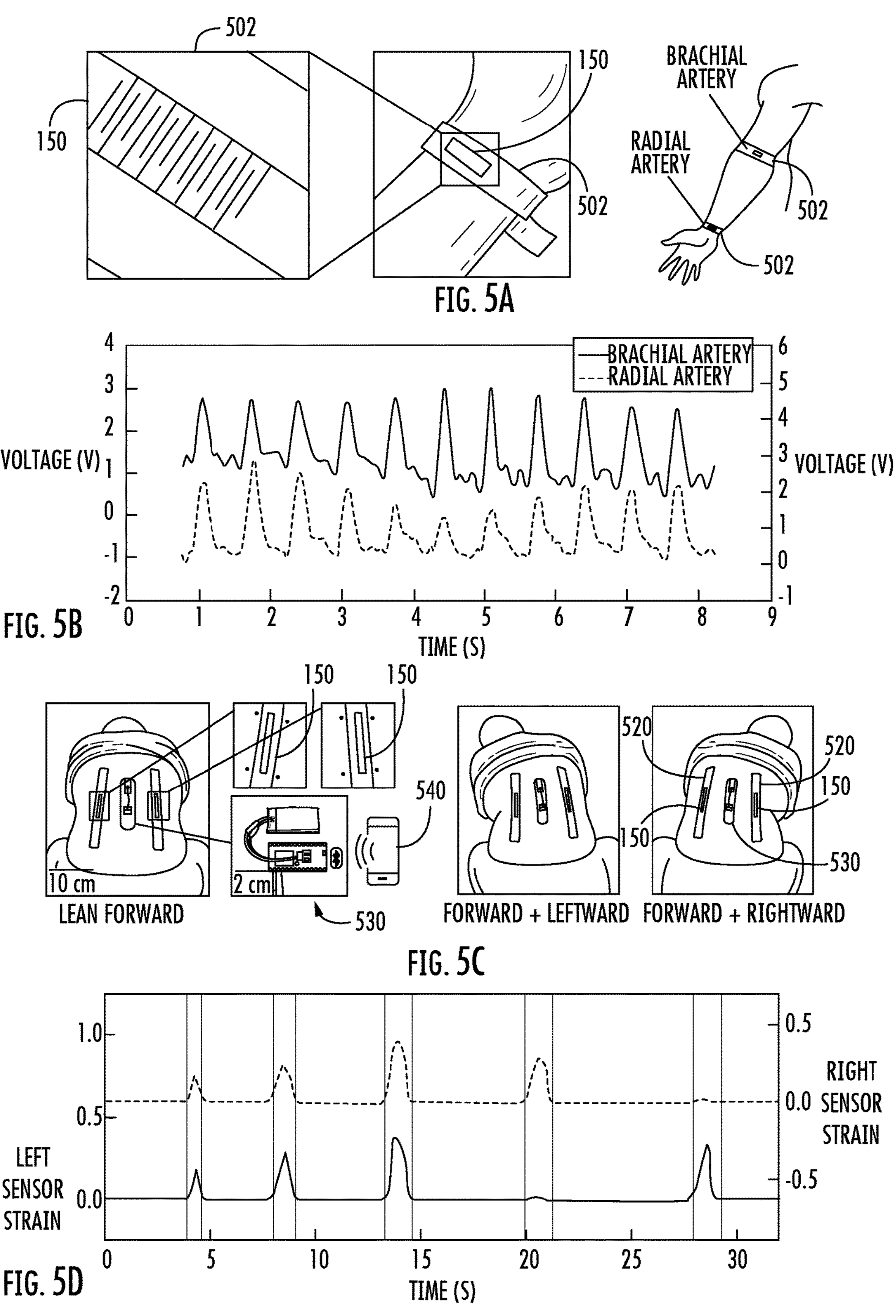
FIG. 5A shows the setup consisting of a band with a slot filled with a strain sensor.
FIG. 5B is a chart showing sensing results of two blood pulse strain sensors placed on the radial artery on the wrist and the brachial artery on the arm.
FIG. 5C are images of the sensor integrated with an athletic tape attached side by side along the spine for monitoring lower back strains and an image of the two sensors and a Bluetooth evaluation board for data collection and transmission.
FIG. 5D shows the measured strain signals of two sensors.

FIGS. 5A-5D show graphs and images of a strain sensor demonstrating personal health monitoring. To demonstrate the versatile applicability of the strain sensors for monitoring human motions, we first applied the sensors on the wrist to detect the pulse wave, which represents one of the most delicate strain signals on human skin. FIG. 5A shows an image and magnified image of strain sensor 150 integrated with a rubber band 502 for monitoring blood pulse. FIG. 5A shows the setup consisting of band 502 with a slot filled with strain sensor 150. Band 502 was fastened on the wrist to secure strain sensor 150 against the pulsing area. When the blood pumps through the vein, the two ends of strain sensor 150 are fixed by band 502 while the middle is bent and stretched. Then, the cracks are opened on the top surface of strain sensor 150. FIG. 5B is a chart showing sensing results of two blood pulse strain sensors placed on the radial artery on the wrist and the brachial artery on the arm. The dotted-line curve in FIG. 5B shows the pulse wave captured from the radial artery on the wrist. Similarly, another strain sensor can be placed on the brachial artery on the arm, recording another pulse wave simultaneously as represented by the solid-line curve in FIG. 5B). By measuring the distance between the two pulse areas and taking the average of the time gap between peaks of the two pulse waves, the averaged pulse wave velocity (PWV) can be measured, based on which the blood pressure (BP) can be obtained following $$BP = \alpha PWV^2 + \beta$$

where $\alpha$=0.18 kPa·s$^2$·m$^{-2}$ and $\beta$=2.7 kPa. Taking PWV=7.5 m/s as measured from FIG. 5B, the BP was calculated to be 12.8 kPa, which equals 96.2 mmHg.

FIG. 5C are images of strain sensor 150 integrated with an athletic tape 520 attached side by side along the spine for monitoring lower back strains and an image of the two sensors and a Bluetooth® evaluation board 530 for data collection and transmission. The other demonstration aimed to monitor the large strains on the lower back, which is a critical signal for metabolic syndrome and spine issues. Strain sensor 150 was integrated onto athletic tape 520 by fixing the two ends of the strain sensor 150 on the athletic tape 520 using a PDMS precursor. Two sensor/tape setups were attached on the lower back side by side in parallel with the spine. An Arduino® Bluetooth® board/tape 530 was attached in the middle area of the lower back to collect and transmit the sensing signals to a smart phone 540. The details of the Bluetooth® board design are shown in FIG. 17, where $R_0$ is the dummy resistor and $R_1$-$R_6$ are the six available channels (only two used in this demonstration). The subject started from a sitting-straight posture and leaned forward three times with increasing degree. Then, the subject leaned forward while tilting rightward and leftward. FIG. 5D shows the measured strain signals of the two sensor/tape setups. When leaning forward, both sensors responded with resistance increases. While leaning forward and tilted sideways, the resistance of the sensor on the corresponding side remained nearly constant and the one on opposite side increased substantially. The calibration of the sensor/fabric setup is shown in FIG. 18A. Four fiducial markers were drawn alongside the crack-based sensors on the skin for the purpose of validation. The results measured by the sensor and by the fiducial markers showed excellent agreement (FIG. 18B). Of note is that by integrating the strain sensor with a stretchable athletic tape, the overall stretchability of the sensor/tape setup can be increased on demand according to the need of the applications. In the setup, the strain distributions in the sensor/tape region and the pure tape are different. Due to the larger Young's modulus, the sensor/tape region has a smaller strain than the pure tape region. By adjusting the modulus ratio, a sensor/tape setup can be easily integrated for wearable applications with large stretchability, e.g., motion tracking on human joints.

Figure 19A:
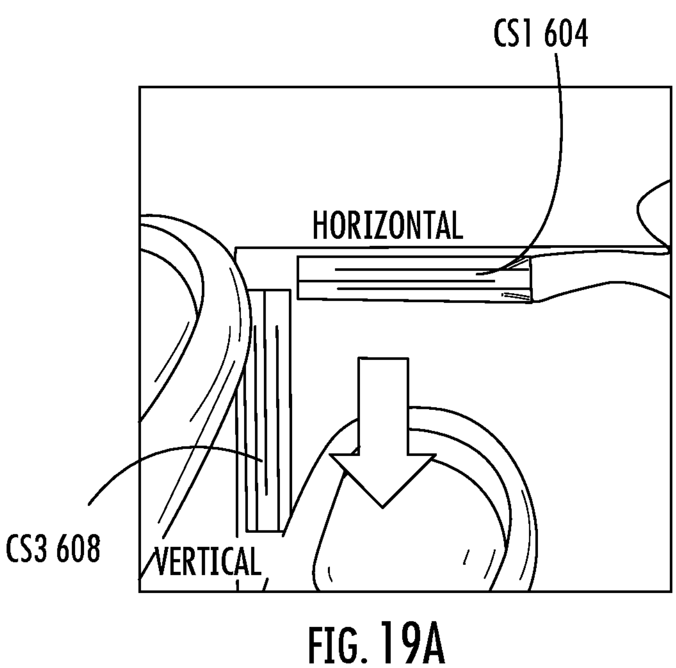
FIG. 19A shows a shear strain sensing system with two orthogonal strain sensors.
Figure 19B:
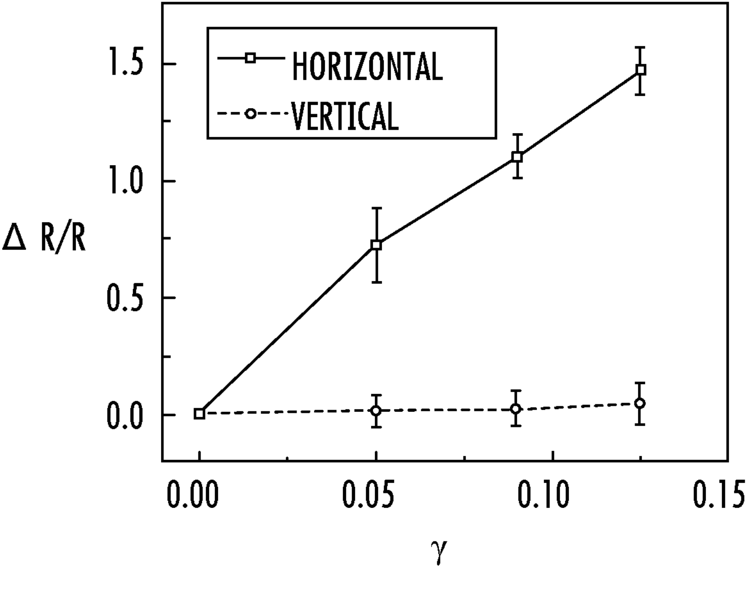
FIG. 19B is a graph depicting resistance change of the sensors in horizontal direction and vertical direction with a vertical shear strain applied.

In addition to wearable personal health monitoring, strain sensor 150 can be applied for human-machine interfaces, tactile sensing, and robotics. FIG. 6A shows the schematic diagram of an integrated 3D touch sensor 600. Touch sensor 600 includes two solid AgNW/PDMS composite in the middle to form a capacitive pressure sensor 602 that detects normal pressure, while the four surrounding AgNW/PDMS composite ribbons with the surface crack design (CS1 604, CS2 606, CS3 608, and CS4 610) are strain sensors 150 detecting shear stress. Pressure sensor 602 was connected to a capacitance evaluation board and the shear sensors were connected to a multichannel resistance meter, as shown in FIG. 6B. FIGS. 19A and 19B show the calibration results of the shear sensors. When a shear force is applied in the middle area, one shear stress sensor away from the moving direction is stretched. The cracks in the stretched sensor open, resulting in a resistance increase. FIG. 6C shows excellent decoupled responses when shear forces in four directions were applied sequentially. FIG. 6D shows real-time control of an airplane in a video game with the functions of turning left, turning right, acceleration, and deceleration. This device illustrates a promising potential in virtual reality and soft human-machine interfaces.

FIG. 6E shows the touch sensor 600 applied for tactile sensing. The sensor was integrated on the fingertip of a glove and then used for grasping a glass of water (200 g). FIG. 6F captures the shear and normal strains of two trials with different lifting and dropping speeds. When the glass of water was grabbed but not lifted, the capacitance of the middle sensor increased while the resistance of the shear sensor remained constant. During lifting, the shear strain increased to overcome the gravity of the glass of water. When dropping the water on the table, the shear strain decreased to zero followed by the normal strain decreasing to zero. Note that the shear strain curve of the first trial showed a period of overshot because the fast lifting required extra shear force for acceleration. However, the second trial was 3 times slower in the lifting speed and the shear strain showed no obvious overshot. This application demonstrated the great potential for tactile sensing for robotics.

Figure 7:
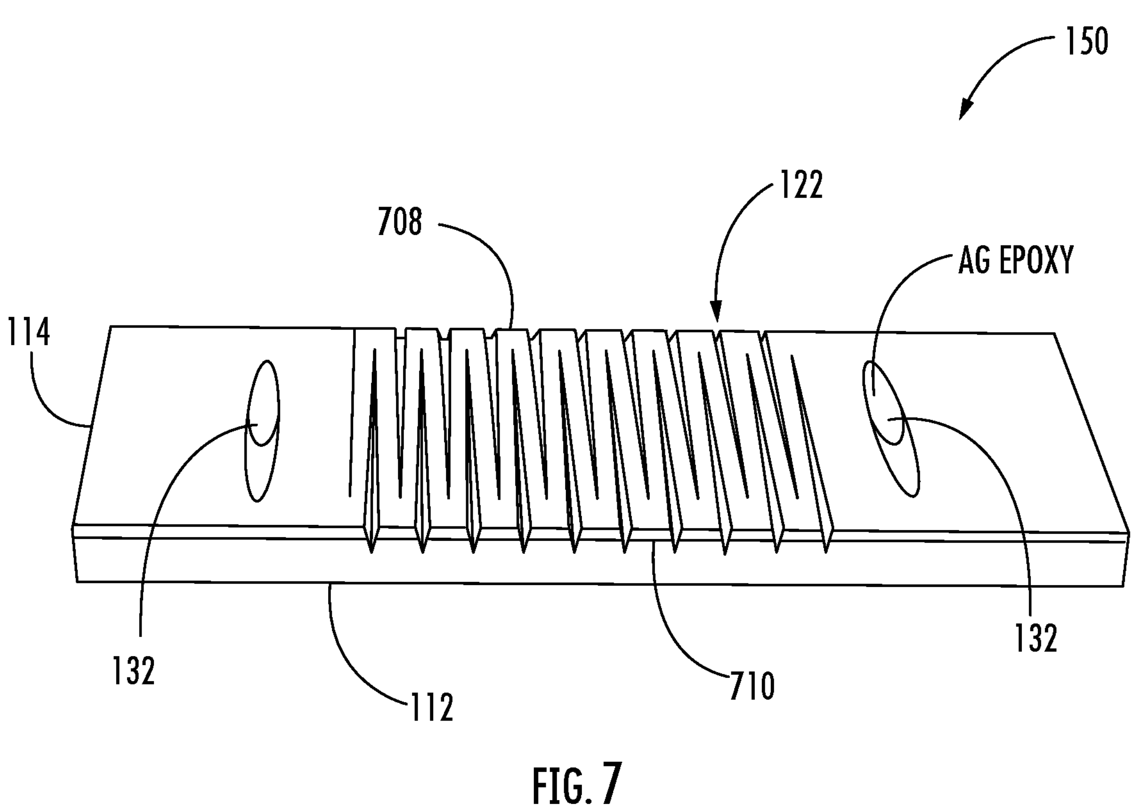
FIG. 7 illustrates a strain sensor.

FIG. 7 shows an example strain sensor 150 with a composite layer 114 including a conductive nanowire network embedded in the elastomer. The conductive nanowire network may be embedded below the surface of the elastomer. A surface of composite layer 114 and the conductive nanowire network opposite an elastomer layer 112 includes intervallic incisions 122. Elastomer layer 112 can comprise the same elastomer in composite layer 114. Elastomer layer 112 may be pure elastomer. In some embodiments, elastomer layer 112 can be directly on composite layer 114. Intervallic incisions 122 extend alternatingly and inwardly from one of two opposing edges of the surface of composite layer 114, namely a first edge 708 and an opposite second edge 710, creating a zigzag pattern. Intervallic incisions 122 may be evenly spaced apart. Strain sensor 150 may include electrical leads 132 on either side of intervallic incisions 122 to provide and measure a current between them. As a shear force is applied to strain sensor 150, the strain sensor 150 stretches and the cracks forms by intervallic incisions 122 propagate, requiring the current to meander along the zigzag pattern and causing an increased overall resistance for the current as the strain sensor 150 stretches.

FIG. 8 is a graph illustrating the resistance change of AgNW/PDMS composites with increase of the number of cuts. The cuts are through the width direction with depth of ½ of the thickness of the sample.

FIGS. 9A and 9B show SEM images of cut surfaces of AgNW/PDMS composite with AgNW densities of 0.1 and 0.5 mg/cm$^2$, respectively.

FIG. 10 is a graph illustrating force-displacement curves of a razor blade pushing into the AgNW/PDMS composites of different AgNW densities.

FIGS. 11A and 11B are graphs illustrating resistance change and stress, respectively, of the strain sensor under 20 cycles of loading and unloading with the applied strain of 30% at different strain rates (1.2 mm/s, 0.6 mm/s and 0.3 mm/s).

FIG. 12A is a graph illustrating crack length with respect to applied strain. FIG. 12B is a graph illustrating relative resistance changes with respect to crack length.

FIG. 13 depicts FEA simulation of the strain distribution of a strain sensor under 30% applied strain.

FIG. 14A is a graph illustrating FEA results of the stress-strain curve of a strain sensor with different $d_c/t$ compared to a strain sensor without cuts. FIG. 14B is a graph illustrating FEA results of the stress-strain curve of a strain sensor with different p/w compared to a strain sensor without cuts. FIG. 14C is a graph illustrating FEA results of the stress-strain curve of a strain sensor with different $l_c/w$ compared to a strain sensor without.

FIG. 15 is a graph illustrating resistance changes of the AgNW/PDMS composite under 5% and 6% stretching-and-unloading.

FIG. 16A shows a strain sensor comparable to strain sensor 150 with composite layer 114 and elastomer layer 112. FIG. 16B is a graph comparing FEA and experimental results of the sensor with p/w=0.1, 0.2 and 0.3. FIG. 16C shows electrical current densities of the strain sensor at zero and 15% strain depicts electromechanical simulation of the strain sensor.

Figure 17A:
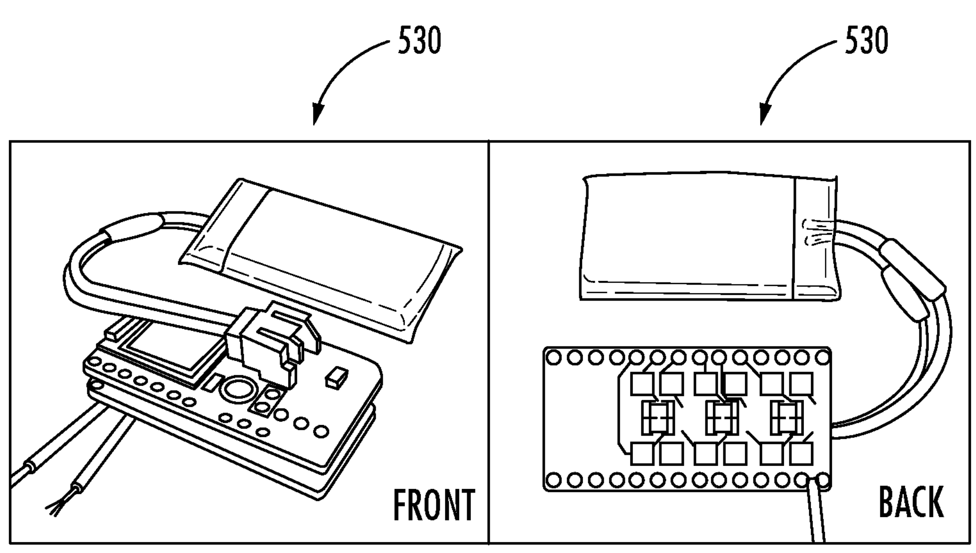
FIG. 17A shows a front and back view of the Arduino® Bluetooth® board for the wearable strain sensing system (with custom-made voltage divider circuit)
Figure 17B:
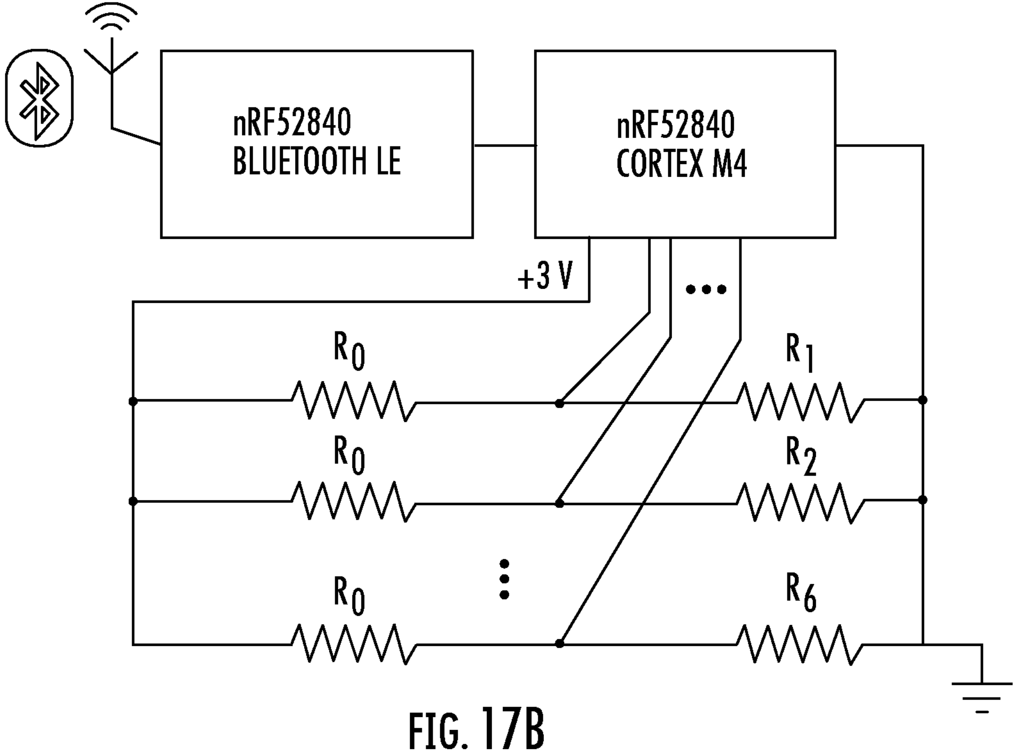
FIG. 17B is a diagram showing the design of the Bluetooth® board and voltage divider circuit.
Figure 18A:
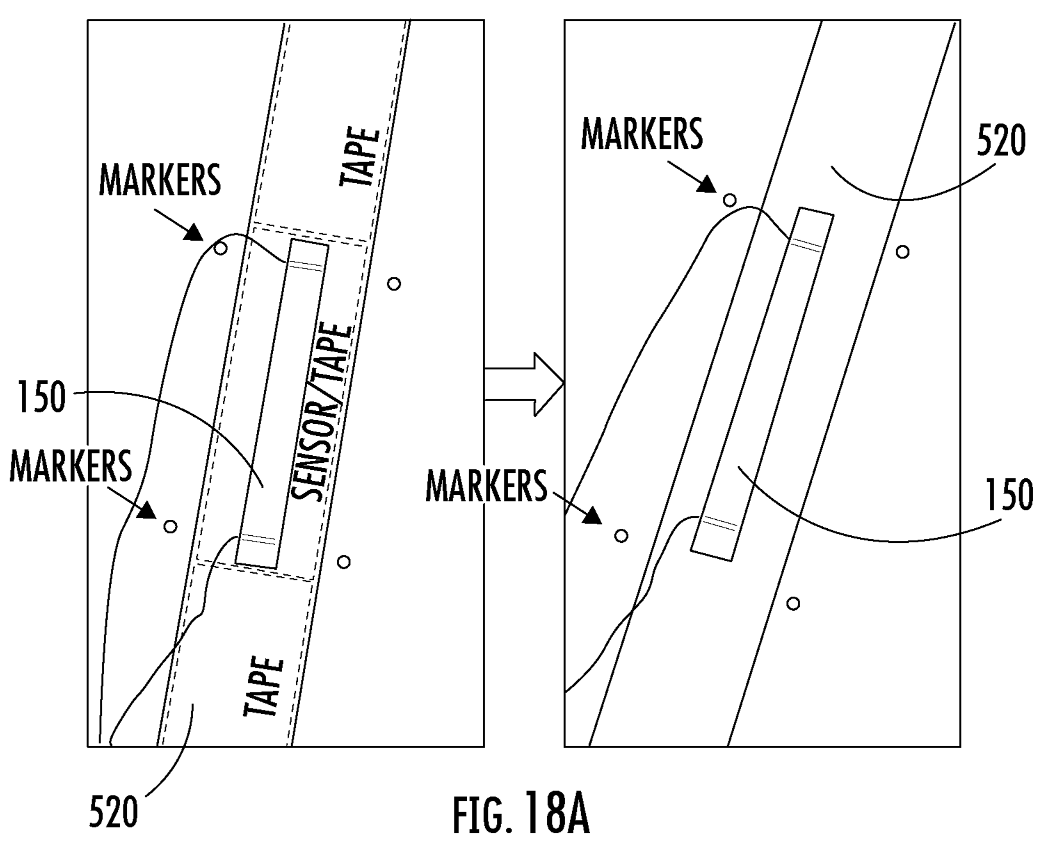
FIG. 18A depicts calibration of strain sensors integrated with athletic tape.
Figure 18B:
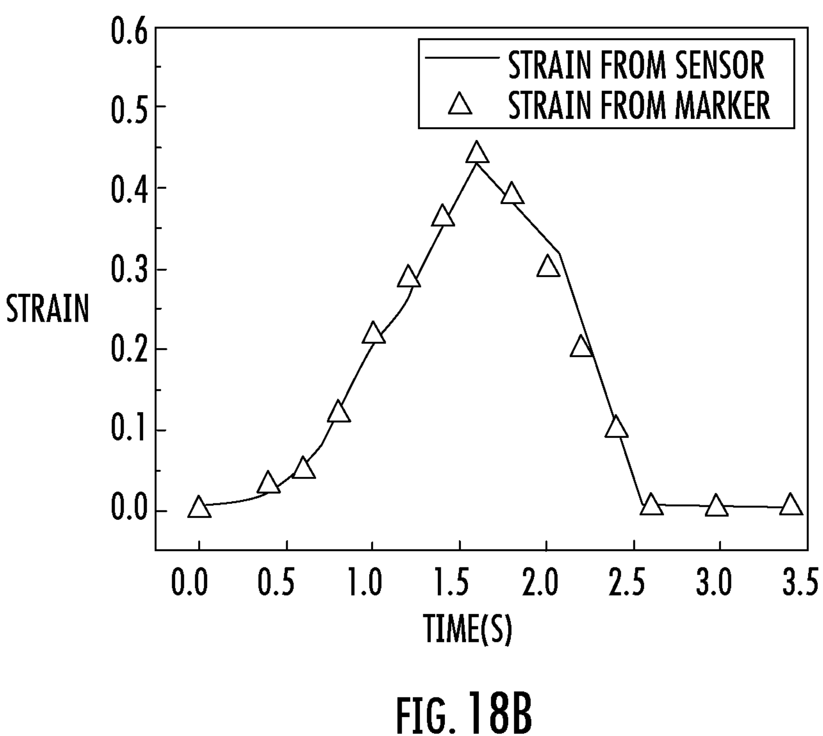
FIG. 18B is a graph depicting the difference between the strains measured by the sensor/fabric and by the fiducial markers using a camera.

FIG. 17A shows a front and back view 530 of the Arduino® Bluetooth® board for the wearable strain sensing system (with custom-made voltage divider circuit). FIG. 17B is a diagram showing the design of the Bluetooth® board and voltage divider circuit.

FIG. 18A depicts calibration of strain sensors 150 integrated with athletic tape 520. FIG. 18A includes photographs of the sensor/tape setup with fiducial marker dots on the skin. FIG. 18B is a graph depicting the difference between the strains measured by the sensor/fabric and by the fiducial markers using a camera.

FIGS. 19A and 19B depict calibration of the shear strain sensor enabled by two orthogonal strain sensors. FIG. 19A shows a shear strain sensing system with two orthogonal strain sensors, namely CS1 604 and CS3 608. FIG. 19B is a graph depicting resistance change of the sensors in horizontal direction and vertical direction with a vertical shear strain applied.

Figure 20:
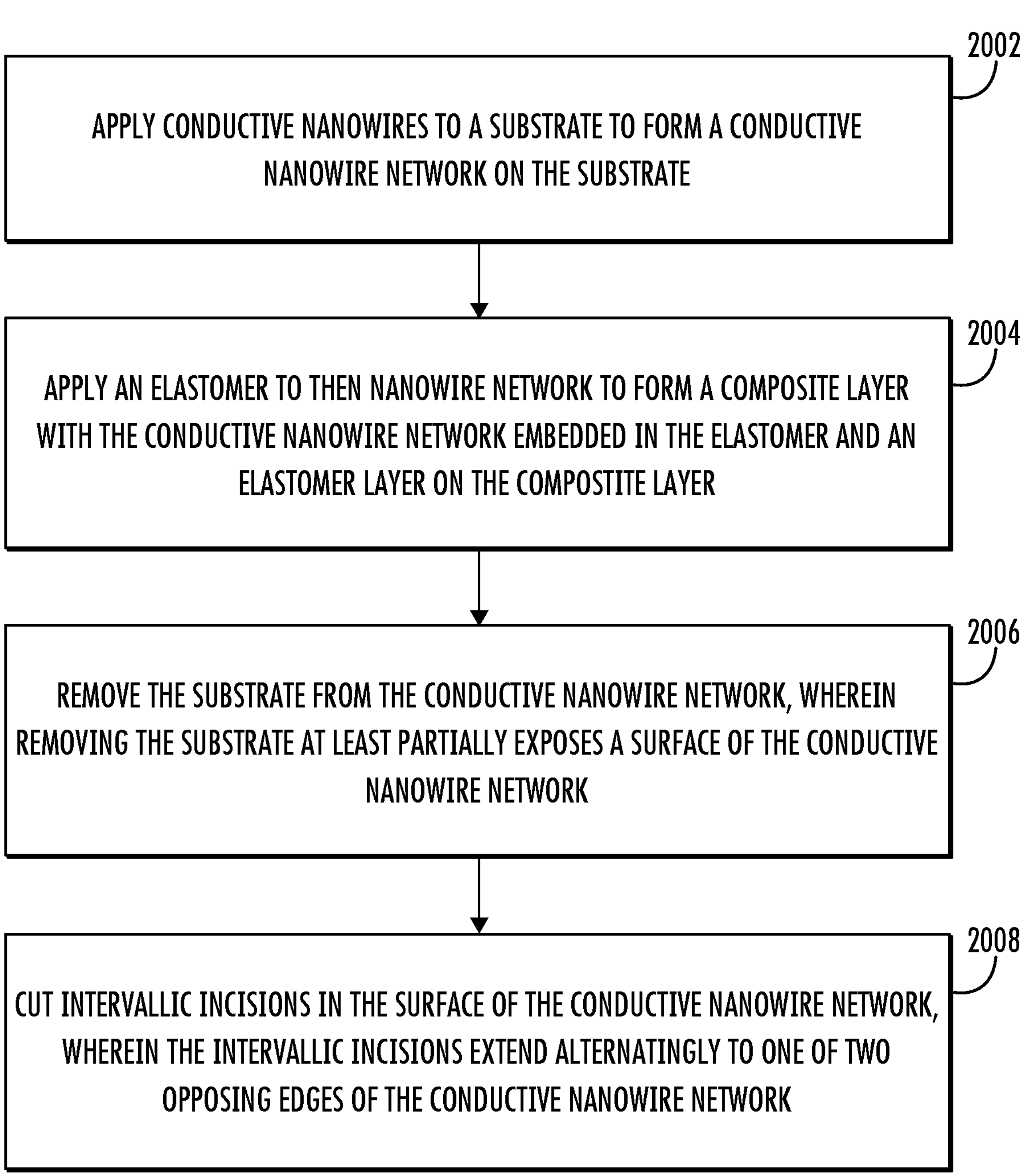
FIG. 20 is a flow diagram of an example method for producing a strain sensor using crack propagation, opening and blunting according to an embodiment of the subject matter described herein.

FIG. 20 is a flow diagram illustrating an example method for producing a strain sensor using crack propagation, opening and blunting. At step 2002, conductive nanowire is applied to a substrate to form a conductive nanowire network on the substrate.

At step 2004, an elastomer is applied to the nanowire network to form a composite layer with the conductive nanowire network embedded in the elastomer and an elastomer layer on the composite layer. The elastomer layer may be a layer of pure elastomer. The elastomer may include PDMS.

At step 2006, the substrate is removed from the conductive nanowire network, wherein removing the substrate at least partially exposes a surface of the conductive nanowire network.

At step 2008, intervallic incisions are cut in the surface of the conductive nanowire network, wherein the intervallic incisions extend alternatingly and inwardly from one of two opposing edges of the conductive nanowire network. The conductive nanowire network may at least partially extend into the elastomer layer at the intervallic incisions. The intervallic incisions may at least partially extend into the elastomer layer. The intervallic incisions may be evenly spaced apart and substantially parallel. Electrical leads may be attached to the strain sensor, wherein the intervallic incisions are between the electrical leads. The strain sensor may be attached to an elastic band. The conductive nanowire network and elastomer may be cured.

CONCLUSION

In summary, this work reported simple, facile fabrication of a versatile soft stretchable strain sensor based on resistive sensing for wearable applications. We designed and fabricated an AgNW/PDMS composite-based strain sensor with simple mechanical cuts into the top surface. Under the applied strain, the resistance increased as the crack propagated (the sensing range) but remained constant as the crack reached the slit length (the reversible range). Under further loading, the local strain in front of the crack tip would cause irreversible sliding in the AgNW network, leading to irreversible resistance change. The effects of the slit depth, slit length, and pitch between the slits were studied to optimize the sensor performances. This sensor overcame the limitation of most existing strain sensors and offered unprecedented combination of GF, strain sensing range, and robustness (under overstrain and 1000 repeated loading cycles). A large GF of 290.1 was achieved with a sensing range over 22%. FEA was conducted to validate the electrical performance and predict the mechanical damage, agreeing very well with the experimental results. As demonstrations, the stretchable strain sensor was integrated into several systems for wearable monitoring of blood pressure and lower back health and 3D touch sensing that tracks both compressive and shear stresses simultaneously, illustrating the promising potential for a range of applications including personal human health monitoring, human-machine interfaces, and tactile sensing for robotics.

Methods

Synthesis of AgNW Solution. First, 60 mL of a 0.147 M PVP (MW~40,000, Sigma-Aldrich) solution in EG was added to a flask, to which a stir bar was added; the solution was then suspended in an oil bath (temperature 151.5° C.) and heated for 1 hour under magnetic stirring (150 rpm). Then, 200 μL of a 24 M $CuCl_2$ ($CuCl_2 \cdot 2H_2O$, >99.999%, Sigma-Aldrich) solution in EG was injected into the PVP solution. The mixture solution was then injected with 60 mL of a 0.094 M $AgNO_3$ (>99%, Sigma-Aldrich) solution in EG.

Fabrication of the Strain Sensor. The AgNW solution was drop-cast on a plasma-treated glass slide, which was placed onto a hot plate at 50° C. to evaporate the solvent. After the solvent was evaporated, liquid PDMS (SYLGARD 184, DOW, Inc.) with a weight ratio of 10:1 was mixed thoroughly and dropped on top of the AgNW film in a rectangular mold. The AgNW/PDMS composite was cured at 70°

C. for 1 hour. The cured sample was then cut from the top surface using a mechanical cutter (silhouette CAMEO). Copper wires were attached to the two outer ends of the sample by silver epoxy (MG Chemicals).

Fabrication of the 3D Touch Sensor. First, the as-synthesized AgNWs were drop-cast onto a sacrificial substrate. The AgNWs together with the sacrificial substrate were then laser cut into a cross-shaped pattern. The pattern defined the conductive area into five regions: a square region in the middle (one electrode of the capacitive sensor) and four surrounding rectangular regions (for making the crack-based resistive strain sensors). PDMS was poured on top of the five pieces of AgNWs and then baked at 70° C. for 1 hour. After curing of PDMS, the sample was flipped over and cut on the designed areas using the mechanical cuter. Another piece of AgNW/PDMS composite was glued on top of the middle square region to compose a capacitive pressure sensor. Then, all five parts of the touch sensor were wired with copper wires.

Video Game Control Using the 3D Touch Sensor. To transmit the resistance signal, we used an Arduino® board (nano 33) and built a simple voltage divider circuit with four dummy resistors. Each channel of the touch sensor was connected to a dummy resistor in series. The voltages across dummy resistors and crack sensors were collected by the Arduino® board and processed to calculate the real-time resistances of the sensors in each direction. An Arduino® code was built to read the real-time resistance values of each channel and compare them to a triggering threshold Rt to decide whether or not to send out a signal. For example, when the 3D touch sensor was pressed and pushed to the right direction, the left crack sensor CS3 reached a resistance increase of over 20% which triggered the Arduino® board to send out a keyboard signal "right arrow." As a result, the airplane in the video game will make a right turn. Similarly, the other three crack-based sensors have been assigned to "left arrow," "up arrow," and "down arrow." In the airplane video game, the four arrow keys represent the functions of turning left, turning right, acceleration, and deceleration.

The disclosure of each of the following references is incorporated herein by reference in its entirety.

REFERENCES (1) Lipomi, D. J., et al. Skin-Like Pressure and Strain Sensors Based on Transparent Elastic Films of Carbon Nanotubes. Nat. Nanotechnol. 2011, 6, 788-792.

(2) Chung, H. U., et al. Skin-Interfaced Biosensors for Advanced Wireless Physiological Monitoring in Neonatal and Pediatric Intensive-Care Units. Nat. Med. 2020, 26, 418-429.

(3) Amjadi, M.; Kyung, K. U.; Park, I.; Sitti, M. Stretchable, Skin-Mountable, and Wearable Strain Sensors and Their Potential Applications: A Review. Adv. Funct. Mater. 2016, 26, 1678-1698.

(4) Kim, D.-H., et al. Epidermal Electronics. Science 2011, 333, 838-843.

(5) Boutry, C. M., et al. A Stretchable and Biodegradable Strain and Pressure Sensor for Orthopaedic Application. Nat. Electron. 2018, 1, 314-321.

(6) Libanori, A., et al. Smart Textiles for Personalized Healthcare. Nat. Electron. 2022, 5, 142-156.

(7) Zhou, Z., et al. Sign-to-Speech Translation Using Machine-Learning-Assisted Stretchable Sensor Arrays. Nat. Electron. 2020, 3, 571-578.

(8) Amjadi, M., et al. Highly Stretchable and Sensitive Strain Sensor Based on Silver Nanowire-Elastomer Nanocomposite. ACS Nano 2014, 8, 5154-5163.

(9) Cai, G., et al. Extremely Stretchable Strain Sensors Based on Conductive Self-Healing Dynamic Cross-Links Hydrogels for Human-Motion Detection. Adv. Sci. 2017, 4, No. 1600190.

(10) Yao, S.; Zhu, Y. Wearable Multifunctional Sensors Using Printed Stretchable Conductors Made of Silver Nanowires. Nanoscale 2014, 6, 2345-2352.

(11) Yao, S.; Vargas, L.; Hu, X.; Zhu, Y. A Novel Finger Kinematic Tracking Method Based on Skin-Like Wearable Strain Sensors. IEEE Sens. J. 2018, 18, 3010-3015.

(12) Yao, S., et al. Nanomaterial-Enabled Flexible and Stretchable Sensing Systems: Processing, Integration, and Applications. Adv. Mater. 2020, 32, No. 1902343.

(13) Yu, Y., et al. Biofuel-Powered Soft Electronic Skin with Multiplexed and Wireless Sensing for Human-Machine Interfaces. Sci. Rob. 2020, 5, No. eaaz7946.

(14) Wang, K., et al. Nanowire-Based Soft Wearable Human-Machine Interfaces for Future Virtual and Augmented Reality Applications. Adv. Funct. Mater. 2021, No. 2008347.

(15) Jeong, J.-W., et al. Materials and Optimized Designs for Human-Machine Interfaces Via Epidermal Electronics. Adv. Mater. 2013, 25, 6839-6846.

(16) Zhou, W., et al. Gas-Permeable, Ultrathin, Stretchable Epidermal Electronics with Porous Electrodes. ACS Nano 2020, 14, 5798-5805.

(17) Lu, N.; Kim, D.-H. Flexible and Stretchable Electronics Paving the Way for Soft Robotics. Soft Rob. 2014, 1, 53-62.

(18) Rich, S. I.; Wood, R. J.; Majidi, C. Untethered Soft Robotics. Nat. Electron 2018, 1, 102-112.

(19) Thuruthel, T. G.; Shih, B.; Laschi, C.; Tolley, M. T. Soft Robot Perception Using Embedded Soft Sensors and Recurrent Neural Networks. Sci. Rob. 2019, 4, No. eaav1488.

(20) Araromi, O. A., et al. Ultra-Sensitive and Resilient Compliant Strain Gauges for Soft Machines. Nature 2020, 587, 219-224.

(21) Wu, S.; Baker, G. L.; Yin, J.; Zhu, Y. Fast Thermal Actuators for Soft Robotics. Soft Rob. 2021, 1031-1039.

(22) Yamada, T.; Hayamizu, Y.; Yamamoto, Y.; Yomogida, Y.; Izadi-Najafabadi, A.; Futaba, D. N.; Hata, K. A Stretchable Carbon Nanotube Strain Sensor for Human-Motion Detection. Nat. Nanotechnol. 2011, 6, 296-301.

(23) Ryu, S., et al. Extremely Elastic Wearable Carbon Nanotube Fiber Strain Sensor for Monitoring of Human Motion. ACS Nano 2015, 9, 5929-5936.

(24) Zhu, S., et al. Inherently Conductive Poly (Dimethylsiloxane) Elastomers Synergistically Mediated by Nanocellulose/Carbon Nanotube Nanohybrids toward Highly Sensitive, Stretchable, and Durable Strain Sensors. ACS Appl. Mater. Interfaces 2021, 13, 59142-59153.

(25) Yu, X., et al. Graphene-Based Smart Materials. Nat. Rev. Mater. 2017, 2, No. 11126.

(26) Bae, S.-H., et al. Graphene-Based Transparent Strain Sensor. Carbon 2013, 51, 236-242.

(27) Iqra, M., et al. A Flexible Piezoresistive Strain Sensor Based on Laser Scribed Graphene Oxide on Polydimethylsiloxane. Sci. Rep. 2022, 12, No. 4882.

(28) Zheng, M., et al. Strain Sensors Based on Chromium Nanoparticle Arrays. Nanoscale 2014, 6, 3930-3933.

(29) Zhou, Y., et al. Giant Magnetoelastic Effect in Soft Systems for Bioelectronics. Nat. Mater. 2021, 20, 1670-1676.

(30) Zhao, X., et al. Soft Fibers with Magnetoelasticity for Wearable Electronics. Nat. Commun. 2021, 12, No. 6755.

(31) Chen, G., et al. Discovering Giant Magnetoelasticity in Soft Matter for Electronic Textiles. Matter 2021, 4, 3725-3740.

(32) Zhao, X., et al. Giant Magnetoelastic Effect Enabled Stretchable Sensor for Self-Powered Biomonitoring. ACS Nano 2022, 16, 6013-6022.

(33) Xu, J., et al. A Programmable Magnetoelastic Sensor Array for Self-Powered Human-Machine Interface. Appl. Phys. Rev. 2022, 9, No. 031404.

(34) Yao, S.; Zhu, Y. Nanomaterial-Enabled Stretchable Conductors: Strategies, Materials and Devices. Adv. Mater. 2015, 27, 1480-1511.

(35) Ho, M. D., et al. Percolating Network of Ultrathin Gold Nanowires and Silver Nanowires toward “Invisible” Wearable Sensors for Detecting Emotional Expression and Apexcardiogram. Adv. Funct. Mater. 2017, 27, No. 1150845.

(36) Yao, S., et al. Multifunctional Electronic Textiles Using Silver Nanowire Composites. ACS Appl. Mater. Interfaces 2019, 11, 31028-31037.

(37) Kim, K. K., et al. Highly Sensitive and Stretchable Multidimensional Strain Sensor with Prestrained Anisotropic Metal Nanowire Percolation Networks. Nano Lett. 2015, 15, 5240-5247.

(38) Huang, J., et al. Wrinkle-Enabled Highly Stretchable Strain Sensors for Wide-Range Health Monitoring with a Big Data Cloud Platform. ACS Appl. Mater. Interfaces 2020, 12, 43009-43017.

(39) Sun, H., et al. A Highly Sensitive and Stretchable Yarn Strain Sensor for Human Motion Tracking Utilizing a Wrinkle-Assisted Crack Structure. ACS Appl. Mater. Interfaces 2019, 11, 36052-36062.

(40) Yan, Z., et al. Stretchable Micromotion Sensor with Enhanced Sensitivity Using Serpentine Layout. ACS Appl. Mater. Interfaces 2019, 11, 12261-12271.

(41) Gao, Y., et al. Winding-Locked Carbon Nanotubes/Polymer Nanofibers Helical Yarn for Ultrastretchable Conductor and Strain Sensor. ACS Nano 2020, 14, 3442-3450.

(42) Li, C., et al. Flexible Cnt-Array Double Helices Strain Sensor with High Stretchability for Motion Capture. Sci. Rep. 2015, 5, No. 15554.

(43) Sun, R., et al. Kirigami Stretchable Strain Sensors with Enhanced Piezoelectricity Induced by Topological Electrodes. Appl. Phys. Lett. 2018, 112, No. 251904.

(44) Wu, C., et al. Based Triboelectric Nanogenerators Made of Stretchable Interlocking Kirigami Patterns. ACS Nano 2016, 10, 4652-4659.

(45) Jiang, Y., et al. Auxetic Mechanical Metamaterials to Enhance Sensitivity of Stretchable Strain Sensors. Adv. Mater. 2018, 30, No. 1122589.

(46) Kang, D., et al. Ultrasensitive Mechanical Crack-Based Sensor Inspired by the Spider Sensory System. Nature 2014, 516, 222-226.

(47) Atalay, O., et al. A Highly Stretchable Capacitive-Based Strain Sensor Based on Metal Deposition and Laser Rastering. Adv. Mater. Technol. 2017, 2, No. 1150081.

(48) Lee, J., et al. Highly Sensitive Multifilament Fiber Strain Sensors with Ultrabroad Sensing Range for Textile Electronics. ACS Nano 2018, 12, 4259-4268.

(49) Jeong, Y. R., et al. S. Highly Stretchable and Sensitive Strain Sensors Using Fragmentized Graphene Foam. Adv. Funct. Mater. 2015, 25, 4228-4236.

(50) Shi, C., et al. Stretchable, Rehealable, Recyclable, and Reconfigurable Integrated Strain Sensor for Joint Motion and Respiration Monitoring. Research 2021, 2021, No. 9846036.

(51) Dorsey, E. R.; Bloem, B. R. The Parkinson Pandemic a Call to Action. JAMA Neurol. 2018, 75, 9-10.

(52) Monje, M. H.; Foffani, G.; Obeso, J.; Sánchez-Ferro, Á. New Sensor and Wearable Technologies to Aid in the Diagnosis and Treatment Monitoring of Parkinson's Disease. Ann. Rev. Biomed. Eng. 2019, 21, 111-143.

(53) Deuschl, G., et al. Clinical Neurophysiology of Tremor. J. Clin. Neurophysiol. 1996, 13, 110-121.

(54) Xu, F.; Zhu, Y. Highly Conductive and Stretchable Silver Nanowire Conductors. Adv. Mater. 2012, 24, 5117-5122.

(55) Liao, Q., et al. Carbon Fiber-Zno Nanowire Hybrid Structures for Flexible and Adaptable Strain Sensors. Nanoscale 2013, 5, 12350-12355.

(56) Ma, Y., et al. Relation between Blood Pressure and Pulse Wave Velocity for Human Arteries. Proc. Natl. Acad. Sci. U.S.A. 2018, 115, 11144-11149.

(57) Roy, S. H.; De Luca, C. J.; Casavant, D. A. Lumbar Muscle Fatigue and Chronic Lower Back Pain. Spine 1989, 14, 992-1001.

(58) Dankaerts, W., et al. Differences in Sitting Postures Are Associated with Nonspecific Chronic Low Back Pain Disorders When Patients Are Subclassified. Spine 2006, 31, 698-112.

(59) Xia, Y., et al. One-Dimensional Nanostructures: Synthesis, Characterization, and Applications. Adv. Mater. 2003, 15, 353-389.

(60) Yao, S.; Cui, J.; Cui, Z.; Zhu, Y. Soft Electrothermal Actuators Using Silver Nanowire Heaters. Nanoscale 2017, 9, 3797-3805.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for producing a strain sensor using crack propagation, opening and blunting, the method comprising:

applying conductive nanowires to a substrate to form a conductive nanowire network on the substrate;

applying an elastomer to the nanowire network to form a composite layer with the conductive nanowire network embedded in the elastomer and an elastomer layer on the composite layer;

removing the substrate from the conductive nanowire network, wherein removing the substrate at least partially exposes a surface of the conductive nanowire network; and cutting intervallic incisions in the surface of the conductive nanowire network, wherein the intervallic incisions extend alternatingly and inwardly from one of two opposing edges of the conductive nanowire network.

2. The method of claim 1 wherein the intervallic incisions at least partially extend into the elastomer layer.

3. The method of claim 2 wherein the conductive nanowire network at least partially extends into the elastomer layer at the intervallic incisions.

4. The method of claim 1 wherein the intervallic incisions are evenly spaced apart.

5. The method of claim 4 wherein the intervallic incisions are substantially parallel.

6. The method of claim 1 comprising curing the conductive nanowire network and elastomer.

7. The method of claim 1 comprising attaching electrical leads, wherein the intervallic incisions are between the electrical leads.

8. The method of claim 7 comprising connecting the strain sensor to a microcontroller board configured for wireless communication.

9. The method of claim 8 comprising attaching the strain sensor to an elastic band.

10. The method of claim 1 wherein the elastomer comprises polydimethylsiloxane (PDMS).

11. A strain sensor using crack propagation, opening and blunting, the strain sensor comprising:
- a composite layer comprising a conductive nanowire network embedded in an elastomer; and
- an elastomer layer on the composite layer;
- wherein a surface of the conductive nanowire layer opposite the elastomer layer comprises intervallic incisions extending alternatingly and inwardly from one of two opposing edges of the surface of the conductive nanowire layer.

12. The strain sensor of claim 11 wherein the intervallic incisions at least partially extend into the elastomer layer.

13. The strain sensor of claim 12 wherein the conductive nanowire network at least partially extends into the elastomer layer at the intervallic incisions.

14. The strain sensor of claim 11 wherein the intervallic incisions are evenly spaced apart.

15. The strain sensor of claim 14 wherein the intervallic incisions are substantially parallel.

16. The strain sensor of claim 11 wherein the conductive nanowire network and elastomer are cured.

17. The strain sensor of claim 11 comprising electrical leads on either side of the intervallic incisions.

18. The strain sensor of claim 17 comprising a microcontroller board configured for wireless communication.

19. The strain sensor of claim 18 wherein the strain sensor is attached to an elastic band.

20. The strain sensor of claim 11 wherein the elastomer comprises polydimethylsiloxane (PDMS).

* * * * *